(12) United States Patent
Gupta et al.

(10) Patent No.: US 12,212,592 B2
(45) Date of Patent: *Jan. 28, 2025

(54) APPARATUSES, METHODS, AND COMPUTER PROGRAM PRODUCTS FOR AUTOMATIC IMPROVED NETWORK ARCHITECTURE GENERATION

(71) Applicant: Honeywell International Inc., Charlotte, NC (US)

(72) Inventors: Tarun Gupta, Bangalore (IN); Anusha Challa, Bangalore (IN); Chetan Siddapura Kallappa, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,162

(22) Filed: May 1, 2023

(65) Prior Publication Data
US 2023/0344850 A1 Oct. 26, 2023

Related U.S. Application Data

(63) Continuation of application No. 16/660,307, filed on Oct. 22, 2019, now Pat. No. 11,677,768.

(51) Int. Cl.
*H04L 9/40* (2022.01)
*H04L 41/08* (2022.01)
(Continued)

(52) U.S. Cl.
CPC ........ *H04L 63/1425* (2013.01); *H04L 41/082* (2013.01); *H04L 41/0886* (2013.01); *H04L 41/145* (2013.01); *H04L 41/22* (2013.01)

(58) Field of Classification Search
CPC . H04L 67/10; H04L 9/50; H04L 63/20; H04L 67/12; H04L 9/3239;
(Continued)

(56) References Cited

U.S. PATENT DOCUMENTS 9,303,806 B2 * 4/2016 Burton ............... F16L 55/11
9,306,806 B1 * 4/2016 Zhang ............. H04L 41/0895
(Continued)

OTHER PUBLICATIONS

U.S. Appl. No. 16/660,307, filed Oct. 22, 2019, U.S. Pat. No. 11,677,768, Patented.
(Continued)

*Primary Examiner* — Djenane M Bayard
(74) *Attorney, Agent, or Firm* — ALSTON & BIRD LLP

(57) ABSTRACT

Various embodiments of the present disclosure are directed to automatic improved network architecture generation. In this regard, embodiments may process data representing a network architecture to generate an improved network architecture that resolves one or more vulnerabilities associated with the network architecture. In this regard, embodiments such as apparatuses, methods, and computer program products, are provided to identify a network architecture comprising a networked device set, determine cybersecurity threat set associated with the network architecture, identify an improved network configuration data set based on the cybersecurity threat set and the network device architecture, wherein each recommended sub network configuration of the improved network configuration data set decreases a threat likelihood associated with at least one determined cybersecurity threat from the cybersecurity threat set, generate an improved network architecture based on the network architecture and the improved network configuration data set, and output the improved network architecture.

17 Claims, 9 Drawing Sheets

(51) Int. Cl.
*H04L 41/082* (2022.01)
*H04L 41/14* (2022.01)
*H04L 41/22* (2022.01)

(58) Field of Classification Search
CPC ............... H04L 63/1441; H04L 9/3247; H04L 63/1408; H04L 41/0893; H04L 41/0894; H04L 47/20; H04L 63/0236; H04L 67/306; H04L 41/0806; H04L 67/34; H04L 67/55; H04L 12/14; H04L 63/08; H04L 63/10; H04L 63/0428; H04L 67/51; H04L 41/5054; H04L 41/5003; H04L 12/1407; H04L 41/5025; H04L 47/2408; H04L 51/046; H04L 63/04; H04L 41/0876; H04L 67/63; H04L 63/0853; H04L 63/0892; H04L 67/145; H04L 41/12; H04L 45/02; H04L 41/0895; H04L 41/40; H04L 41/122; H04L 63/0263; H04L 63/0272; H04L 12/4641; H04L 63/102; H04L 41/22
See application file for complete search history.

(56) References Cited

U.S. PATENT DOCUMENTS

| | | |
|---|---|---|
| 9,692,784 B1 | 6/2017 | Nenov |
| 10,178,112 B2 | 1/2019 | Weilbacher |
| 10,771,506 B1 * | 9/2020 | Kumar .................... H04L 63/02 |
| 2008/0046393 A1 | 2/2008 | Jajodia et al. |
| 2008/0301765 A1 * | 12/2008 | Nicol .................... H04L 41/142 726/1 |
| 2010/0162383 A1 * | 6/2010 | Linden ................ H04L 41/0894 726/13 |
| 2013/0298236 A1 | 11/2013 | Smith et al. |
| 2014/0331274 A1 * | 11/2014 | Bitton ................. H04L 63/0227 726/1 |
| 2015/0117322 A1 * | 4/2015 | McGrath ............... H04W 72/00 370/329 |
| 2016/0352747 A1 * | 12/2016 | Khan .................... H04L 63/102 |
| 2018/0020018 A1 | 1/2018 | Walheim et al. |
| 2018/0109545 A1 | 4/2018 | Weilbacher |
| 2018/0309636 A1 | 10/2018 | Strom et al. |
| 2018/0359275 A1 | 12/2018 | Ng et al. |
| 2021/0099476 A1 * | 4/2021 | Montgomery ...... H04L 63/1425 |

OTHER PUBLICATIONS

EP Office Action Mailed on Jan. 24, 2024 for EP Application No. 20202152, 5 page(s).
Applicant-Initiated Interview Summary Record (PTOL-413) Mailed on Nov. 1, 2021 for U.S. Appl. No. 16/660,307, 2 page(s).
European search opinion Mailed on Mar. 9, 2021 for EP Application No. 20202152, 3 page(s).
European search report Mailed on Mar. 9, 2021 for EP Application No. 20202152, 2 page(s).
Final Rejection Mailed on Mar. 14, 2022 for U.S. Appl. No. 16/660,307, 14 page(s).
Non-Final Rejection Mailed on Jul. 9, 2021 for U.S. Appl. No. 16/660,307, 9 page(s).
Notice of Allowance and Fees Due (PTOL-85) Mailed on Jan. 31, 2023 for U.S. Appl. No. 16/660,307, 9 pages(s).

* cited by examiner

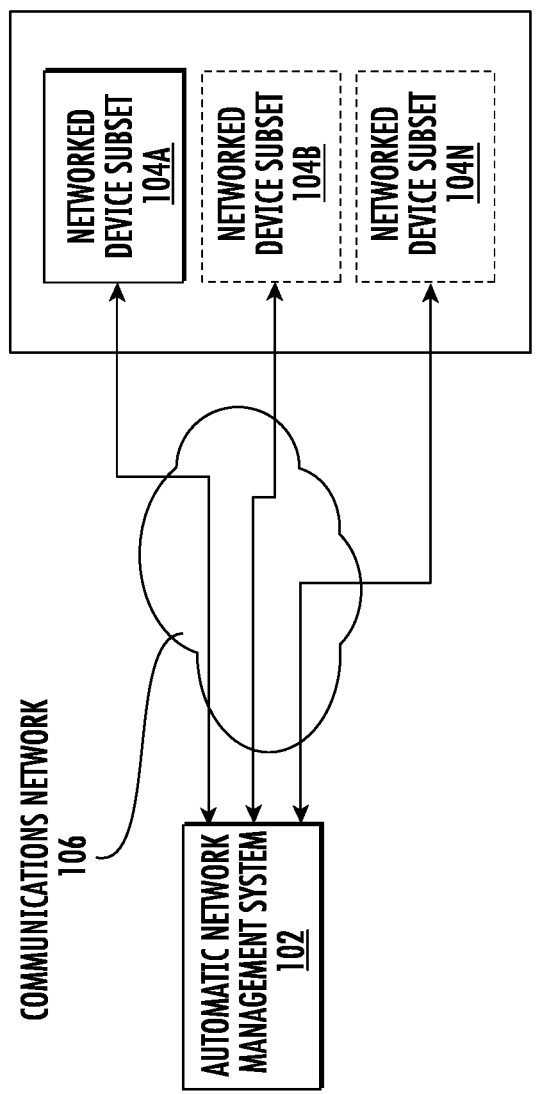
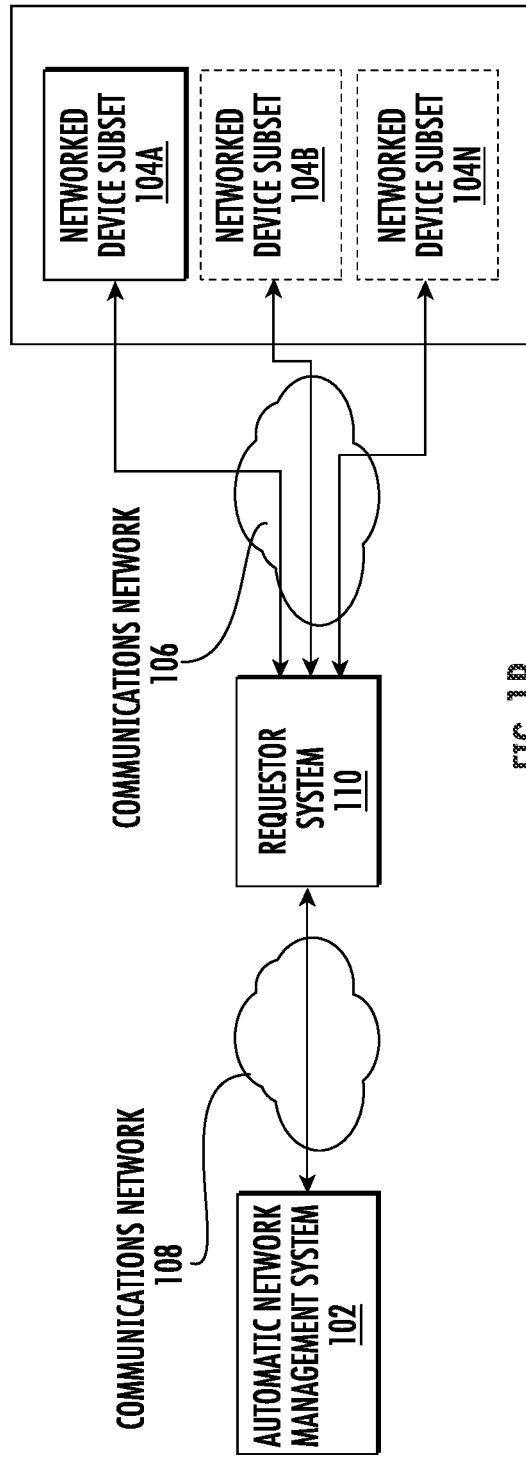

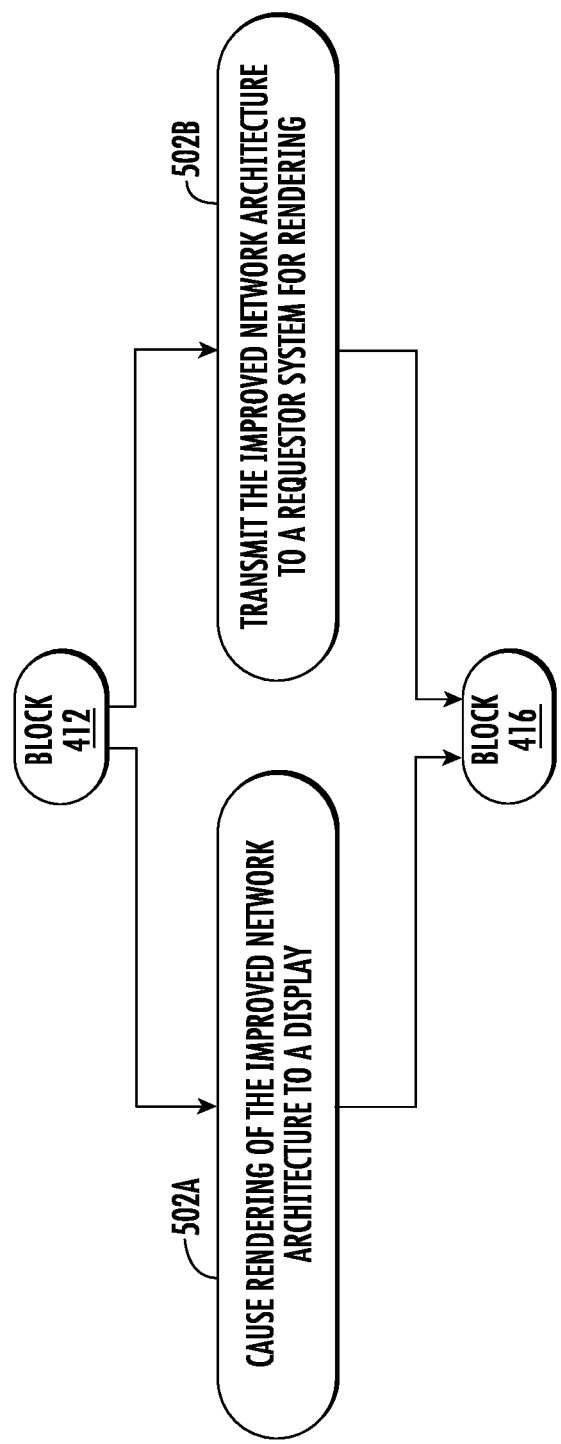

APPARATUSES, METHODS, AND COMPUTER PROGRAM PRODUCTS FOR AUTOMATIC IMPROVED NETWORK ARCHITECTURE GENERATION

CROSS REFERENCE TO RELATED APPLICATIONS

This application is a continuation of U.S. application Ser. No. 16/660,307, titled "APPARATUSES, METHODS, AND COMPUTER PROGRAM PRODUCTS FOR AUTOMATIC IMPROVED NETWORK ARCHITECTURE GENERATION," filed Oct. 22, 2019, the entire contents of which are incorporated herein by reference.

TECHNOLOGICAL FIELD

Embodiments of the present disclosure generally relates to automatic cyber risk assessment and corresponding network architecture generation, and specifically to automatic identification of a cybersecurity threat set associated with a network architecture for use in generating an improved network architecture.

BACKGROUND

Conventionally, cyber security experts are required to ensure a network architecture is secured against cybersecurity threats. Analysis by such experts is time consuming and inefficient. Additionally, relying on the cyber security expert leaves the network architecture vulnerable to human error associated with decision-making by the cyber security expert. Such problems are exacerbated in circumstances where a cyber security expert leaves a particular organization and a new cyber security expert joins the organization and must newly analyze the network architecture for the organization. Applicant has discovered problems with current systems, methods, apparatuses, and computer program products for network architecture generation, and through applied effort, ingenuity, and innovation, Applicant has solved many of these identified problems by developing a solution that is embodied in the present disclosure, which is described in detail below.

BRIEF SUMMARY

In general, embodiments of the present disclosure provided herein include systems, methods, apparatuses and computer program products for automatic improved network architecture generation. Other systems, apparatuses, methods, computer readable media, and features will be, or will become, apparent to one with skill in the art upon examination of the following figures and detailed description. It is intended that all such additional systems, apparatuses, methods, computer readable media, and features be included within this description be within the scope of the disclosure, and be protected by the following claims.

In accordance with one aspect of the present disclosure, an apparatus for automatic improved network architecture generation is provided. In at least one example embodiment, the apparatus includes at least one processor and at least one memory. The at least one memory includes computer-coded instructions stored thereon. The computer-coded instructions, in execution with the at least one processor, configure the apparatus to identify a network architecture comprising a networked device set. The example apparatus is further configured to determine cybersecurity threat set associated with the network architecture. The example apparatus is further configured to identify an improved network configuration data set based on the cybersecurity threat set and the network device architecture, wherein each recommended sub network configuration of the improved network configuration data set decreases a threat likelihood associated with at least one determined cybersecurity threat from the cybersecurity threat set. The example apparatus is further configured to generate an improved network architecture based on the network architecture and the improved network configuration data set. The example apparatus is further configured to output the improved network architecture.

In some example embodiments of the apparatus, outputting the improved network architecture comprises transmitting the improved network architecture to a requestor system for rendering; or rendering the improved network architecture to a display.

In some example embodiments of the apparatus, the example apparatus is further configured to receive an architecture analysis request from a requestor system, and the apparatus is configured to identify the network architecture from the architecture analysis request from the requestor system.

In some example embodiments of the apparatus, the example apparatus is further configured to further configured to output the cybersecurity threat set.

In some example embodiments of the apparatus, the example apparatus is further configured to configure the improved network architecture for rendering to visually distinguish at least one recommended sub-network configuration of the improved network configuration data set.

In some example embodiments of the apparatus, the example apparatus is further configured to identify, based on one or more selected from the group of the network architecture and the cybersecurity threat set, at least one threat solution data object, and at least a portion of the improved network configuration data set is determined based on the at least one threat solution data object. Additionally or alternatively, in some example embodiments of the apparatus, the example apparatus is further configured to output the at least one threat solution data object.

In some example embodiments of the apparatus, to identify the network architecture comprising the networked device set, the apparatus is configured to detect the networked device set associated with at least one accessible communications network.

In some example embodiments of the apparatus, the example apparatus is further configured to identify an updated network architecture; determine an updated cybersecurity threat set associated with the updated network architecture; identify an updated improved network configuration data set based on the updated cybersecurity threat set and the updated network device architecture, wherein each updated recommended sub-network configuration of the updated improved network configuration data set decreases a threat likelihood associated with at least one determined updated cybersecurity threat from the updated cybersecurity threat set; generate an updated improved network architecture based on the updated network architecture and the updated improved network configuration data set; and output the updated improved network architecture.

In accordance with another aspect of the present disclosure, a computer-implemented method for automatic improved network architecture generation is provided. In at least one example embodiment of the computer-implemented method, the computer-implemented method includes identifying a network architecture comprising a networked device set. The example computer-implemented method further includes determining cybersecurity threat set associated with the network architecture. The example computer-implemented method further includes identifying an improved network configuration data set based on the cybersecurity threat set and the network device architecture, wherein each recommended sub network configuration of the improved network configuration data set decreases a threat likelihood associated with at least one determined cybersecurity threat from the cybersecurity threat set. The example computer-implemented method further includes generating an improved network architecture based on the network architecture and the improved network configuration data set. The example computer-implemented method further includes outputting the improved network architecture.

In some example embodiments of the computer-implemented method, outputting the improved network architecture comprises transmitting the improved network architecture to a requestor system for rendering; or rendering the improved network architecture to a display.

In some example embodiments of the computer-implemented method, the computer-implemented method further comprises receiving an architecture analysis request from a requestor system, and the method comprises identifying the network architecture from the architecture analysis request from the requestor system.

In some example embodiments of the computer-implemented method, the computer-implemented method further comprises outputting the cybersecurity threat set.

In some example embodiments of the computer-implemented method, the computer-implemented method further comprises configuring the improved network architecture for rendering to visually distinguish at least one recommended sub-network configuration of the improved network configuration data set.

In some example embodiments of the computer-implemented method, the computer-implemented method further comprises identifying, based on one or more selected from the group of the network architecture and the cybersecurity threat set, at least one threat solution data object, and at least a portion of the improved network configuration data set is determined based on the at least one threat solution data object. Additionally or alternatively, in some example embodiments of the computer-implemented method, the computer-implemented method further comprises outputting the at least one threat solution data object.

In some example embodiments of the computer-implemented method, identifying the network architecture comprising the networked device set comprises detecting the networked device set associated with at least one accessible communications network.

In some example embodiments of the computer-implemented method, the computer-implemented method further comprises identifying an updated network architecture; determining an updated cybersecurity threat set associated with the updated network architecture; identifying an updated improved network configuration data set based on the updated cybersecurity threat set and the updated network device architecture, wherein each updated recommended sub-network configuration of the updated improved network configuration data set decreases a threat likelihood associated with at least one determined updated cybersecurity threat from the updated cybersecurity threat set; generating an updated improved network architecture based on the updated network architecture and the updated improved network configuration data set; and outputting the updated improved network architecture.

In accordance with another aspect of the present disclosure, a computer program product for automatic improved network architecture generation is provided. In at least one example embodiment of the computer program product, the computer program product includes at least one non-transitory computer-readable storage medium having computer program instructions thereon. The computer program instructions, in execution with at least one processor, are configured to identify a network architecture comprising a networked device set. The example computer program product is further configured to determine cybersecurity threat set associated with the network architecture. The example computer program product is further configured to identify an improved network configuration data set based on the cybersecurity threat set and the network device architecture, wherein each recommended sub network configuration of the improved network configuration data set decreases a threat likelihood associated with at least one determined cybersecurity threat from the cybersecurity threat set. The example computer program product is further configured to generate an improved network architecture based on the network architecture and the improved network configuration data set. The example computer program product is further configured to output the improved network architecture.

In some example embodiments of the computer program product, outputting the improved network architecture comprises transmitting the improved network architecture to a requestor system for rendering; or rendering the improved network architecture to a display.

In some example embodiments of the computer program product, the computer program product is further configured to receive an architecture analysis request from a requestor system, and the network architecture is identified from the architecture analysis request from the requestor system.

In some example embodiments of the computer program product, the computer program product is further configured to output the cybersecurity threat set.

In some example embodiments of the computer program product, the computer program product is further configured to configure the improved network architecture for rendering to visually distinguish at least one recommended sub-network configuration of the improved network configuration data set.

In some example embodiments of the computer program product, the computer program product is further configured to identify, based on one or more selected from the group of the network architecture and the cybersecurity threat set, at least one threat solution data object, and at least a portion of the improved network configuration data set is determined based on the at least one threat solution data object. Additionally or alternatively, in some example embodiments of the computer program product, the computer program product is further configured to output the at least one threat solution data object.

In some example embodiments of the computer program product, to identify the network architecture comprising the networked device set, the computer program product is configured to detect the networked device set associated with at least one accessible communications network.

In some example embodiments of the computer program product, the computer program product is further configured to identify an updated network architecture; determine an updated cybersecurity threat set associated with the updated network architecture; identify an updated improved network configuration data set based on the updated cybersecurity threat set and the updated network device architecture, wherein each updated recommended sub-network configuration of the updated improved network configuration data set decreases a threat likelihood associated with at least one determined updated cybersecurity threat from the updated cybersecurity threat set; generate an updated improved network architecture based on the updated network architecture and the updated improved network configuration data set; and output the updated improved network architecture.

BRIEF DESCRIPTION OF THE DRAWINGS

Figure 2:
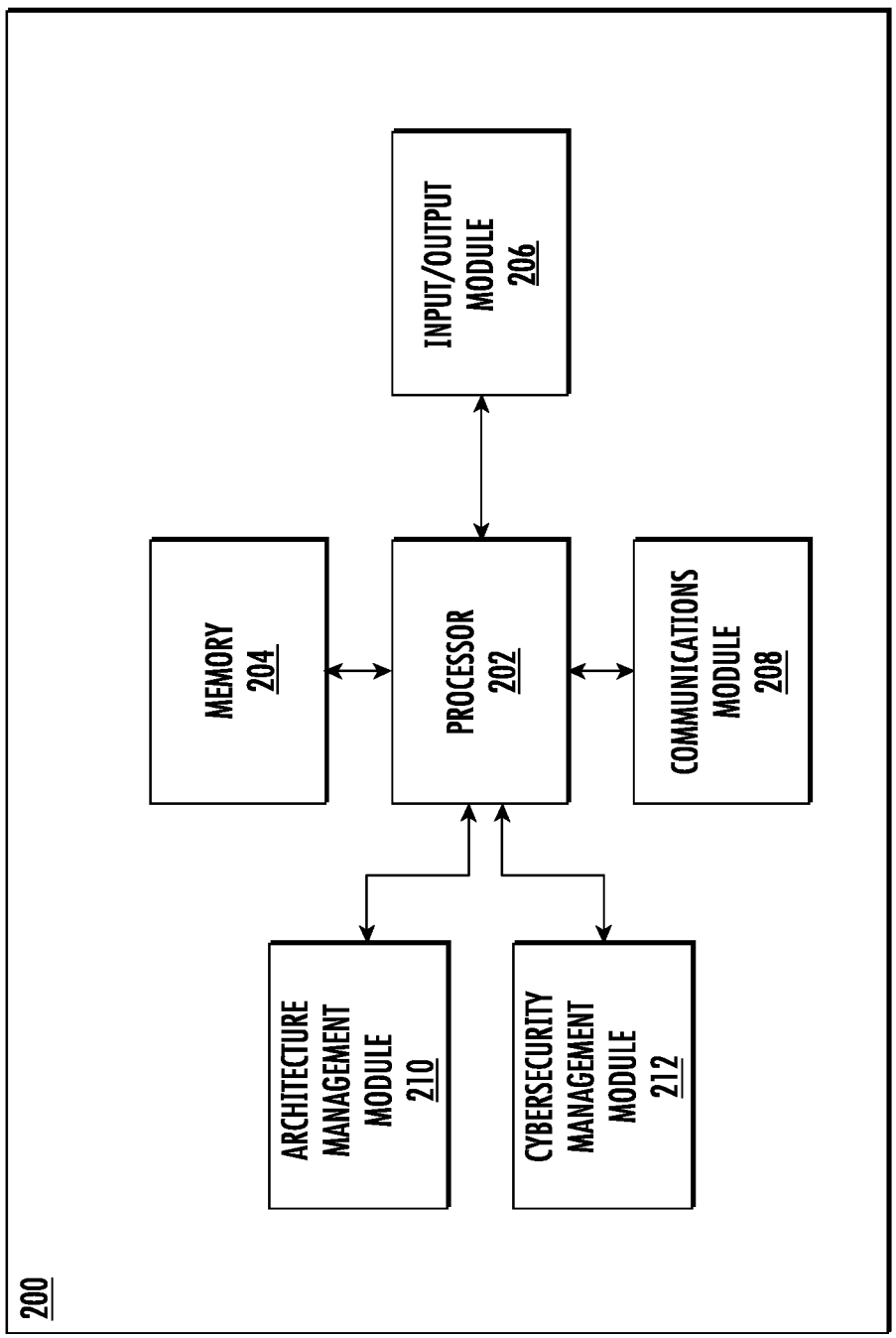
Figure 3A:
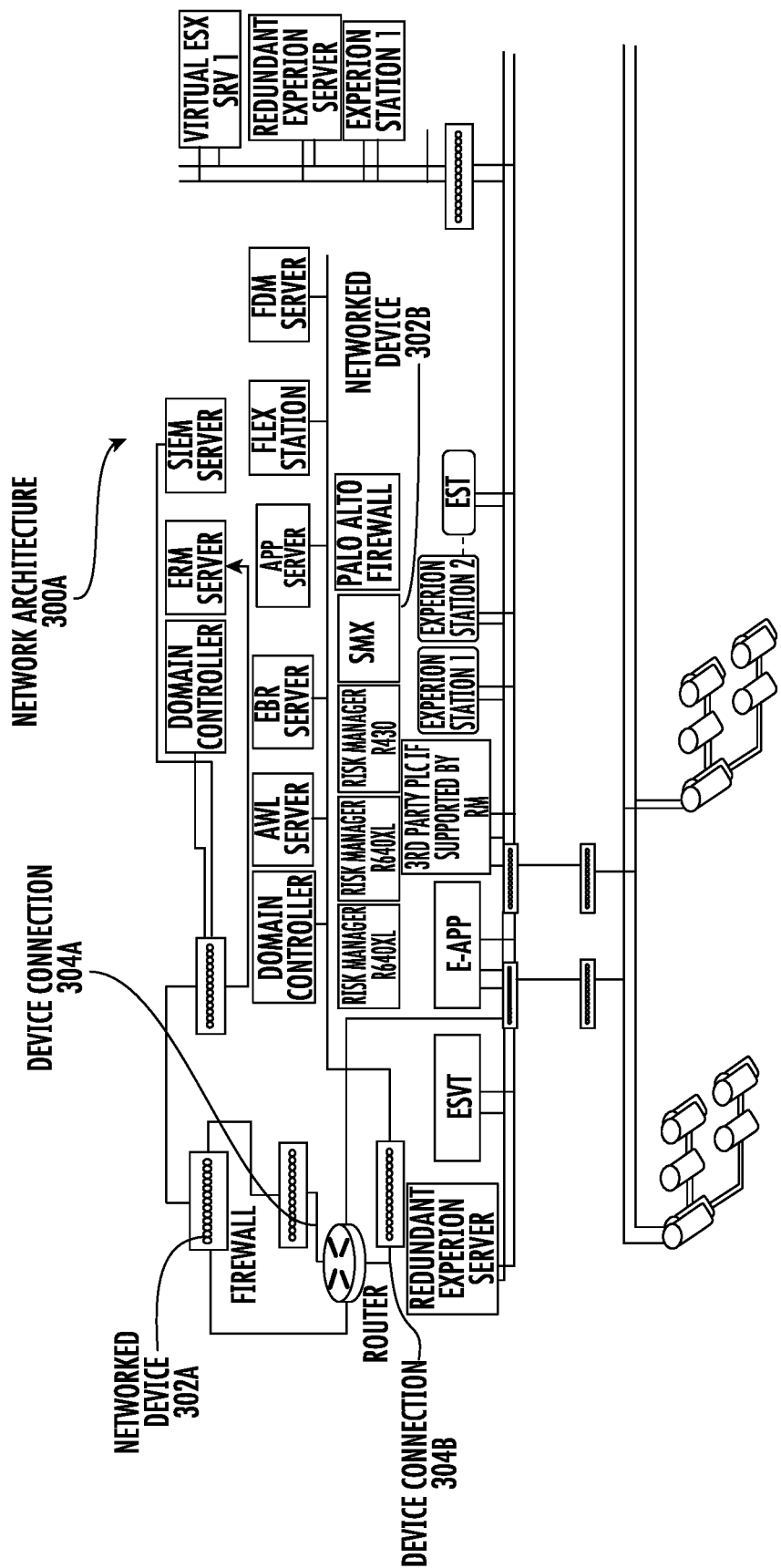
Figure 3B:
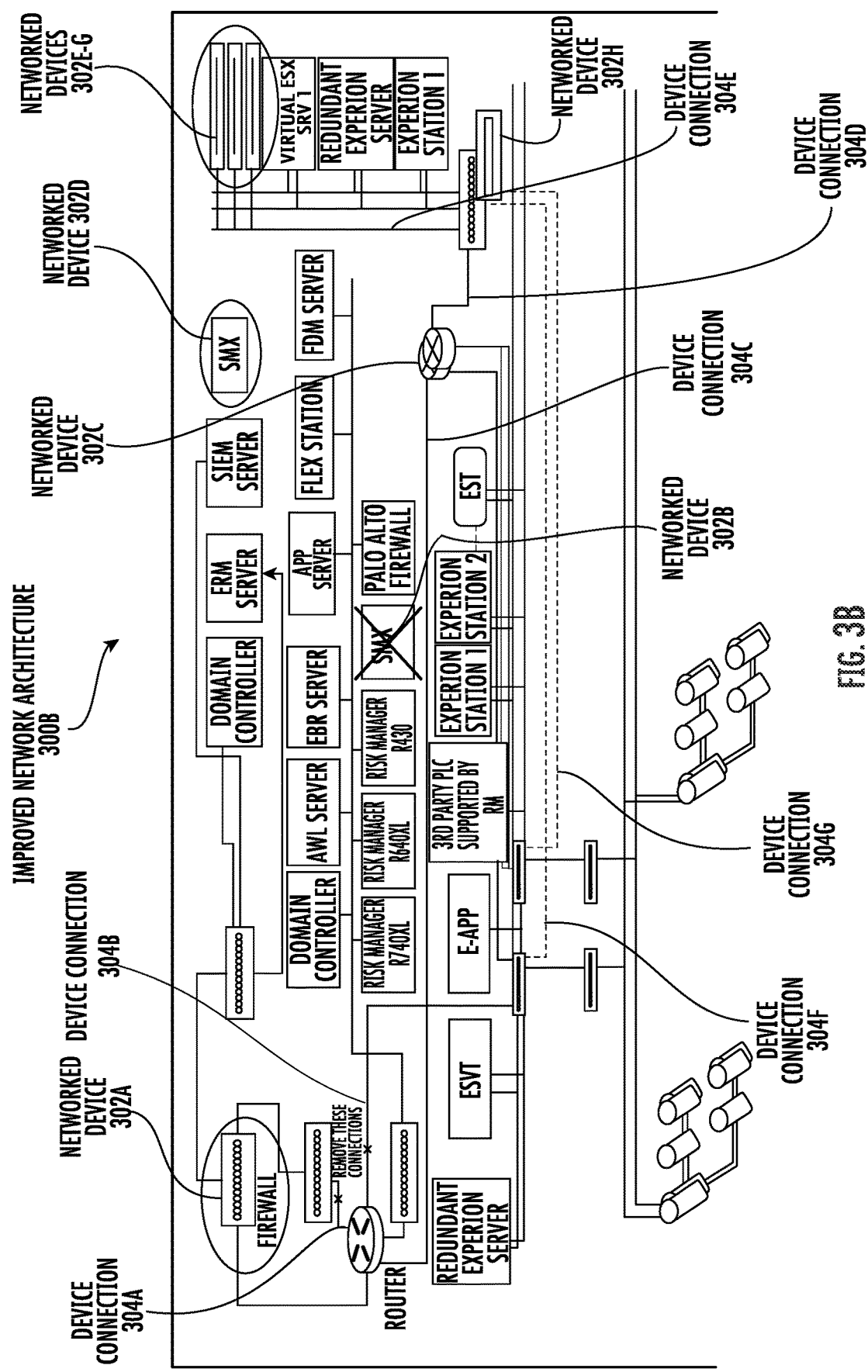

Having thus described the embodiments of the disclosure in general terms, reference now will be made to the accompanying drawings, which are not necessarily drawn to scale, and wherein:

FIGS. 1A and 1B illustrate block diagrams of systems that may be specially configured within which embodiments of the present disclosure may operate;

FIG. 2 illustrates a block diagram of an example apparatus that may be specially configured in accordance with an example embodiment of the present disclosure;

FIG. 3A illustrates an example network architecture in accordance with an example embodiment of the present disclosure;

FIG. 3B illustrates an example improved network architecture in accordance with an example embodiment of the present disclosure; and FIGS. 4-8 illustrate example flowcharts including operations for automatic improved network architecture generation, in accordance with example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like Overview Various individuals, groups, organizations, businesses, and the like, rely on a network architecture that may include any number of networked devices. In specific contexts, for example a large industrial organization, a network architecture may include a significant number of networked devices. The network architecture may include networked devices of various networked device types, increasing the complexity of the overall network architecture. For example, an industrial plant may be associated with a network architecture including hundreds of networked devices, the networked devices being of any number of networked device types. To ensure operations associated with the networked devices continue without threat of cyberattacks, a network architecture may include various specially configured devices, systems, and/or other hardware that implement various security products to enhance protection against cyberattacks.

For a given network architecture and the desired cybersecurity goals of a particular organization, the network architecture may require particular devices and/or cybersecurity products positioned at particular locations within a network architecture. Conventionally, an organization relies on a cybersecurity expert to identify the particular devices and/or cybersecurity products that should be implemented in a network architecture, as well as where the devices and/or cybersecurity products should be implemented, to meet a particular organization's cybersecurity goals. In particular, the cybersecurity expert is conventionally relied to identify vulnerable points in an organization's network architecture, and propose corresponding solutions that address fit the network architecture and resolve such vulnerabilities.

Reliance on cybersecurity experts poses various problems. As an initial matter, cybersecurity experts are in low supply, as such experts require significant knowledge of complex cybersecurity subject matter. Further, reliance on cybersecurity experts exposes the network architecture to human error in identifying vulnerabilities and/or proposing sufficient solutions to the identified vulnerabilities. Often, a cybersecurity expert may analyze an organization's network architecture for a significant amount of time to familiarize themselves with the network architecture to make appropriate recommendations. However, if a single device in the network architecture is added, removed, moved, or otherwise reconfigured within the network architecture, the cybersecurity expert may again be required to reanalyze the network architecture. Further, if a cybersecurity expert for an organization leaves, it will likely be significantly difficult to find a new cybersecurity expert given the small supply of capable candidates. Additionally, when a new cybersecurity expert is brought in, a significant time investment may again be required for the new cybersecurity expert to familiarize themselves with the network architecture for making recommendations.

Various embodiments of the present disclosure are directed to apparatuses, methods, and computer program products for automatic improved network architecture generation. In this regard, the various embodiments enable identification of one or more vulnerabilities and generation of a network architecture that resolves one or more of the identified vulnerabilities. In some such embodiments, the improved network architecture may be configured to resolve such identified vulnerabilities without input from a cybersecurity expert. In this regard, embodiments enable auditing and assessment of an existing network architecture, and generation of an improved network architecture, without significant time investment, cost, and/or specific knowledge requirements conventionally associated with a cybersecurity expert.

In at least one aspect of the disclosure, embodiments determine a cybersecurity threat set associated with a network architecture. The network architecture may include various networked devices communicable over one or more communications networks, for example that form a particular internal network associated with an industrial plant of an organization. The cybersecurity threats may be determined based on various business rules, machine learning, or other processes, such that cyber-risks may be identified automatically without requiring analysis by a human cybersecurity expert.

Further in this regard, embodiments may identify one or more recommended sub-network configurations, for example for the network architecture, based on the cybersecurity threat. The recommended sub-network configurations may include additional devices, additional device configurations for an existing device (for example, new hardware, software, or firmware products to enhance security), and/or recommendations to remove an existing device or move an existing device to a new location within the network architecture. In some such embodiments, a cybersecurity device rule set may be used to generate the improved network architecture, for example such that the improved network architecture may include one or more devices that are configured to satisfy each rule of the cybersecurity device rule set. The cybersecurity device rule set may be standardized or specially configured to meet user-provided requirements selected from various pre-defined rules, or user-defined rules. The improved network architecture may include some or all of the recommended sub-network configurations, such that the improved network architecture addresses some or all of the identified vulnerabilities and improves cybersecurity of the network architecture.

The improved network architecture may be output to one or more systems, devices or the like, for example for rendering to a display such that a user may view and/or analyze the improved network architecture. In some example contexts, a user may initiate one or more actions for updating one or more networked devices based on the recommendations in the improved network architecture. Alternatively, embodiments may automatically initiate such actions without user interaction, for example to automatically update one or more configurations of networked devices in the network architecture.

In this regard, embodiments of the present disclosure address various technical inefficiencies and problems, human efficiencies and problems, and provide specific technical solutions and benefits. For example, embodiments of the present disclosure eliminate reliance on analysis by human cybersecurity experts, which significantly reduces the cost and required time to improve a network architecture. Additionally, some embodiments of the present disclosure perform automatically, enabling consistent analysis and/or improvement, or improvements upon changing a network architecture without requiring reliance on the human cybersecurity expert. Embodiments further provide significant cybersecurity benefits by identifying particular cybersecurity vulnerabilities, and generating improved network architectures that address these cybersecurity vulnerabilities without reliance on the knowledge base of the user or a cybersecurity expert. Removing human subjectivity further enables the embodiments to prevent human-caused problems associated with lack of knowledge, mistake (e.g., failing to identify a cybersecurity vulnerability), and human-inability to analyze complex network architectures and/or changing network architectures quickly. Some embodiments leverage specific technically implemented rule sets and/or modelling implementations to provide efficient and accurate vulnerability identification. Further embodiments generate corresponding improved network architectures that provide associated cybersecurity improvements, for example to reduce or eliminate risk of certain cybersecurity threats.

Example System Architectures

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, computing workstation, or a combination thereof. Further, an example embodiment may be embodied by any of a variety of mobile terminals, mobile telephones, smartphones, laptop computers, tablet computers, or any combination of the aforementioned devices. In this regard, FIGS. 1A and 1B each disclose an example computing system in which embodiments of the present disclosure may operate. FIGS. 1A and 1B each illustrate an overview for a system configured for automatic improved network architecture generation in accordance with embodiments of the present disclosure.

FIG. 1A includes an automatic network management system configured to provide local functionality (e.g., within a local network architecture associated with a particular entity) for automatic improved network architecture generation. FIG. 1A includes an automatic network management system 102 and one or more networked device subsets 104A-104N (collectively "networked device subsets 104"). The networked device subsets 104 may each include any number of various computing devices, hardware, virtual devices, and/or the like, arranged to form a particular network architecture. The automatic network management system 102 may communicate with one or more of the networked device subsets 104 over a communications network 106.

It should be appreciated that the networked device subsets 104 include one or more computing devices configured for communication with the automatic network management system 102 and/or one or more other devices (e.g., "networked devices"). In some embodiments, the automatic network management system 102 is communicable only with one networked device of the networked device subset 104A, for example where the system does not include the networked device subsets 104B and 104C. In some such embodiments, all other networked devices of the networked device subset 104A are communicable with the automatic network management system 102 through the network device in direct communication with the automatic network management system 102. In other embodiments, the automatic network management system 102 is directly communicable with multiple networked devices, each of which may include a sub-network device set. In this regard, it should be appreciated that each networked device subset may include any number of device layers, with the top-layer of the networked device subsets 104 including at least one networked device communicable with the automatic network management system 102.

Each networked device layer of the networked device subsets 104 may comprise one or more networked device(s) associated with a particular type of functionality, such that networked devices are connected such that the network device layer is associated with such functionality. In this regard, the automatic network management system 102 may be embodied by, included in, and/or communicable with a networked device associated with a particular networked device layer (e.g., a top-layer of the sub-network architecture embodying the networked device subsets 104). The automatic network management system 102, in some embodiments, is further communicable with one or more external devices, systems, or the like, or communicable with one or more higher-layer devices configured for performing such external communications in a secure manner. In this regard, a "network architecture" includes various networked device, and each network architecture may include various sub-network architectures, and/or be included in a larger network architecture.

Each of the networked device subsets 104 may include any number of computing devices, hardware devices, virtual devices, or other computing hardware of various types, or a combination thereof. The networked devices in each of the networked device subsets 104 may each form a particular network architecture based on the device connections between networked devices of the subset. Specifically, each networked device may be in communication with one or more other networked devices, for example included in the same networked device subset of networked device subsets 104 or another networked device subset, via a device connection. In a particular context, for example, the networked devices communicate over a local network associated with a particular organization, such as an industrial plant. Specific examples of networked device subsets 104, with particular example networked devices of various networked device types, are depicted with respect to FIG. 3A.

The automatic network management system 102 may include one or more computing devices in communication for performing the operations described herein with respect to automatic improved network architecture generation. The automatic network management system 102 may include one or more servers specially configured with hardware, software, or a combination thereof. The automatic network management system 102 may be configured using hardware, software, or a combination thereof, to provide automatic improved network architecture generation functionality. In this regard, the automatic network management system 102 may be configured to identify the network architecture embodied by the networked device subsets 104, and determine a cybersecurity threat set for the networked devices thereof. The automatic network management system 102 may further be configured to identify an improved network configuration data set based on the determined cybersecurity threat set, and further generate an improved network architecture, for example based on the network architecture and improved network configuration data set.

In some such embodiments, the automatic network management system 102 may be included in a network architecture associated with an entity in control of some, or all, of the networked devices (e.g., an organization, an industrial plant, or the like). In some such embodiments, the automatic network management system 102 may be embodied by, and/or included in, one or more systems, devices, or the like of the network architecture. For example, the automatic network management system may be included in or embodied by a L3 device of the network architecture (e.g., a risk manager server associated with cybersecurity functionality for a network architecture including one or more lower-layer devices, for example L2 and/or L1 networked devices), and/or L2 device of the network architecture (e.g., one or more application server(s) or client device(s)). In this regard, the automatic network management system 102 may be associated with a sub-network architecture including the networked device subsets 104.

The automatic network management system 102 may be configured to communicate with one or more of the networked devices of the networked deice subsets 104 over the communications network 106. The communications network 106 may include any combination of one or more wired and/or wireless communication network, including, for example and without limitation, a wired or wireless local area network (LAN), personal area network (PAN), metropolitan area network (MAN), wide area network (WAN), or the like, as well as hardware, software, and/or firmware for implementing the network (for example, network routers and the like). For example, the communications network 106 may include, in some contexts, a cellular telephone network, an 802.11, 802.16, 802.20, and/or WiMax network. In some embodiments, the communications network 106 includes a public network, such as the Internet, a private network, such as an intranet or other local network, or any combination thereof. The communications network 106 may utilize any number of a variety of networking protocols now available or developed later, including, without limitation, TCP/IP based networking protocols. For instance, the networking protocol may be customized to suit the needs of the networked device subsets 104 and/or automatic network management system 102. In some embodiments, the protocol includes and/or embodies a custom protocol of JSON, XML, or other structured data objects. In other embodiments, the protocol includes and/or embodies one or more custom unstructured data protocols.

In an example context, the communications network 106 is embodied only by one or more private networks. In this regard, the networked device subsets 104, and/or the automatic network management system 102, may be configured to communicate without exposure to external devices (for example, via the Internet). The private network(s) improve network security associated with the network architecture embodied by the automatic network management system 102 and sub-network architecture embodied by the networked device subsets 104. In some such embodiments, the automatic network management system 102 may be configured to provide automatic improved network architecture generation functionality associated with a network architecture comprising the networked device subsets 104 without exposing the networked devices to communications by outside devices, servers, systems, and/or the like. Such embodiments further improve cybersecurity of the network architecture through generation of an improved network architecture for implementation.

In some other embodiments, it should be appreciated that the automatic network management system 102 may provide remote and/or cloud functionality for automatic improved network architecture generation. In this regard, the automatic network management system 102 may be accessed by one or more devices of an entity-controlled network architecture, for example one or more client devices, to request processing of a network architecture. The client devices may be configured to transmit to, and receive from, the automatic network management system 102 in a secure manner, utilizing one or more devices specifically connected and/or configured to provide such secure communications.

In this regard, the system illustrated in FIG. 1B includes the automatic network management system 102 in communication with a requestor system 110. The requestor system 110 is in communication with the networked device subsets 104. The automatic network management system 102 may communicate with the requestor system over a communications network 108. The requestor system 110 communicates with the networked device subsets 104 over communications network 106.

In some embodiments, the requestor system 110 embodies a top-layer networked device of a network architecture including at least the requestor system 110 and a sub-network architecture embodying the networked device subsets 104. The requestor system 110, for example, may be embodied by one or more servers configured to function as a networking demilitarized zone for securely communicating information to the networked devices of the networked device subsets 104, and/or securely communicating information received from the networked devices of the networked device subsets 104. For example, the requestor system 110 may include and/or be in communication with one or more networking servers for handling received transmissions, one or more proxy servers for securing the internal network comprising one or more networked devices of the networked device subsets 104, and/or one or more firewall or other network security devices. In some such embodiments, the transmissions received by the requestor system 110 may be processed for securely transmitting to one or more client devices of the networked device subsets 104, for example for rendering to one or more displays viewable to a user. In some such embodiments, the client device(s), alone or in combination with one or more networked devices, for example one or more application servers, are configured to automatically identify data embodying a network architecture to be processed by the automatic network management system 102 (such as a network architecture including the networked devices of the networked device subsets 104). The client devices may be further configured for transmitting the automatically identified and/or received data representing the network architecture to the requestor system 110, for example to cause the requestor system 110 to transmit a request, such as an architecture analysis request, including the data representing the network architecture to the automatic network management system 102

In other embodiments, the requestor system 110 embodies a client device configured to provide one or more interfaces for display to a user and/or configured to receive user interaction data associated with one or more displayed interfaces and/or associated with user engagement with one or more peripheral hardware devices. In response to user interaction, the requestor system 110 may generate and/or transmit one or more requests to the automatic network management system 102 for processing. The requestor system 110 may then receive one or more responses from the automatic network management system 102. For example, the requestor system 110 may transmit one or more architecture analysis request(s) to the automatic network management system 102, and receive one or more responses including data representing an outputted improved network architecture. The requestor system 110 may further process the improved network architecture (for example, to cause execution of one or more instructions set for updating networked devices of the networked device subsets 104 based on the improved network architecture) and/or render one or more interfaces associated with the improved network architecture to a display for viewing by a user.

In some embodiments, the communications network 108 is embodied by one or more public networks (e.g., the Internet). The communications network 108 may include any number of public devices. In this regard, the requestor system 110 may request processing of a network architecture, and receive response data associated with the processing of the network architecture (e.g., data representing an improved network architecture) over the communications network 108. Additionally, in some embodiments, the communications network 106 is embodied by one or more private, or internal, networks. In some embodiments, for example, the requestor system 110 may be directly connected to one or more of the networked devices of the networked device subsets 104, where the device connections embody the communications network 106.

Alternatively or additionally, in some embodiments, for example, the communications network 106 includes one or more networked devices configured to provide transmission functionality and, in some embodiments, transmission security functionality (e.g., one or more networking DMZ servers, one or more proxy systems, one or more firewalls, and/or a combination thereof). In this regard, the requestor system 110 may securely communicate with one or more of the networked devices of the networked device subsets 104, for example to identify a networked device set, or cause an associated networked device to identify the networked device set (e.g., by querying one or more of the networked devices in the networked device subsets 104), to receive data representing a request to transmit an architecture analysis request to the automatic network management system 102, and/or to securely forward response data from the automatic network management system 102 (for example, to a client device included in one of the networked device subsets of the networked device subsets 104).

Example Apparatus of the Present Disclosure

The control system 102 may be embodied by one or more computing systems, such as the apparatus 200 depicted in FIG. 2. The apparatus 200 may include a processor 202, a memory 204, an input/output module 206, a communications module 208, an architecture management module 210, and a cybersecurity management module 212. The apparatus may be configured, using one or more of the components 202, 204, 206, 208, 210, and/or 212, to execute the operations described herein.

Although the components are described with respect to functional limitations, it should be understood that the particular implementations necessarily include the use of particular hardware. It should also be understood that certain of the components described herein may include similar or common hardware. For example, two sets of components, for example two sets of circuitry or modules, may both leverage use of the same processor(s), network interface(s), storage medium(s), or the like to perform their associated functions, such that duplicate hardware is not required for each set of components. The use of the terms "circuitry" and "module" as used herein with respect to components of the apparatus 200 should therefore be understood to include particular hardware configured to perform the functions associated with the particular circuitry or module as described herein.

The term "circuitry" and "module" should be understood broadly to include hardware and, in some embodiments, software for configuring the hardware. For example, in some embodiments, "circuitry" or "module" may include processing circuitry, storage media, network interfaces, input/output devices, and the like. In some embodiments, other elements of the apparatus 200 may provide or supplement the functionality of another particular module. For example, the processor 202 may provide processing functionality, the memory 204 may provide storage functionality, the communications module 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processor" and the term "processing circuitry" generally may be understood to include a single core processor, a multi-core processor, multiple processors internal to the apparatus, and/or remote or "cloud" processors.

In an example embodiment, the processor 202 may be configured to execute instructions stored in the memory 304 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As just one example, the processor 202 may be configured to identify a network architecture and/or determine a cybersecurity threat set associated with the network architecture. Based on the cybersecurity threat and/or network architecture, the processor 202 may be configured to identify a improved network configuration data set and generate an improved network architecture based on the improved network configuration data set. The processor 202, alone or in combination with one or more of the other modules, may output the improved network architecture, for example to another module, another system for further processing, or to one or more displays for rendering.

In some embodiments, the apparatus 200 may include input/output module 206 that may, in turn, be in communication with processor 202 to provide output to the user and, in some embodiments, to receive an indication of a user interaction (e.g., user input). The input/output module 306 may comprise one or more user interface(s) (e.g., a device monitoring interface) and may include a display that may comprise the interface(s) rendered as a web user interface, an application interface, a client device, a backend system, or the like. In some embodiments, the input/output module 206 may also include a keyboard, a mouse, a joystick, a touch screen, touch areas, soft keys, a microphone, a speaker, or other input/output mechanisms. The processor 202 and/or input/output module 206 comprising the processor may be configured to control one or more functions of one or more user interface elements through computer program instructions (e.g., software and/or firmware) stored on a memory accessible to the processor (e.g., memory 304, and/or the like).

The communications module 208 may be any means such as a device or circuitry embodied in either hardware or a combination of hardware and software that is configured to receive data from and/or transmit data to a network, circuitry, module, and/or any other device in communication with the apparatus 200. In this regard, the communications module 208 may include, for example, a network interface for enabling communications with one or more wired or wireless communication network(s). For example, the communications module 308 may include one or more network interface card(s), antenna(s), bus(es), switch(es), router(s), modem(s), and supporting hardware and/or software, or any other device suitable for enabling communications via one or more communication network(s). Additionally or alternatively, the communications module 308 may include circuitry for interacting with the antenna(s) and/or other hardware or software to cause transmission of signals via the antenna(s) or to handle receipt of signals received via the antenna(s).

The architecture management module 210 includes hardware, software, or a combination thereof, configured to support functionality of an automatic network management system 102 with respect to network architecture identification and/or generation. The architecture management module 210 may utilize processing circuitry, such as the processor 202, to perform these actions. The architecture management module 210 may include hardware, software, and/or a combination thereof, configured to, alone or in conjunction with one or more other modules of the apparatus 200, identify a network architecture associated with one or more communication network(s). For example, the architecture management module 210 may include hardware, software, or a combination thereof, to detect one or more networked devices communicable via a private network (such as a LAN communicable by the apparatus 200). In some embodiments, the network architecture is identified by parsing one or more received data objects representing the network architecture. Additionally or alternatively, in some embodiments, the architecture management module 210 includes software, hardware, or a combination thereof, to generate an improved network architecture based on the network architecture and an improved network configuration data set. For example, the architecture management module 210 may generate the improved network architecture configured as a particular data object, for example configured as a particular file format. It should be appreciated that, in some embodiments, the architecture management module 210 may include a separate processor, specially configured field programmable gate array (FPGA) or a specially programmed application specific integrated circuit (ASIC).

The cybersecurity management module 212 includes hardware, software, or a combination thereof, configured to support functionality of an automatic network management system 102 with respect to determination of a cybersecurity threat set and subsequent processing of the cybersecurity threat set. The cybersecurity management module 212 may utilize processing circuitry, such as processor 202, to perform these actions. In some embodiments, the cybersecurity management module 212 include hardware, software, or a combination thereof configured to, alone or in conjunction with one or more other modules of the apparatus 200, determine a cybersecurity threat set. Additionally or alternatively, in some embodiments, the cybersecurity management module 212 includes hardware, software, or a combination thereof configured to, alone or in combination with one or more of the other modules of apparatus 200, process the cybersecurity threat set, for example to identify a corresponding threat likelihood set and/or to identify a improved network configuration data set based on the cybersecurity threat set and/or a network device architecture. It should be appreciated that, in some embodiments, the cybersecurity management module 212 may include a separate processor, specially configured FPGA or a specially programmed ASIC.

In some embodiments, it should be appreciated that the one or more of the modules 202-212 may be combined. Alternatively or additionally, in some embodiments, one or more of the modules may perform some, or all, of the functionality described associated with another component. For example, in some embodiments, the modules 210 and 212 may be combined into a single module embodied in hardware, software, or a combination thereof. Similarly, in other embodiments, the modules 210, 212, and/or 202 may be combined such that processing circuitry is provided to perform the operations described above with respect to each of these modules.

Example Network Architectures of the Present Disclosure

FIG. 3A depicts an example network architecture analyzed to generate an improved network architecture depicted in FIG. 3B, in accordance with embodiments of the present disclosure. Specifically, FIG. 3A depicts a network architecture 300A that may be processed by an embodiment of the present disclosure, for example an automatic network management system, for example embodied by the apparatus 200. The apparatus 200 may process the network architecture 300A to generate the improved network architecture 300B depicted in FIG. 3B.

The network architecture 300A may include a networked device set including any number of networked devices. The networked device set may include networked devices of various device types. For example, the networked device set may include virtual devices and/or physical devices embodying one or more firewall(s), router(s), switch(es), server(s) configured for serving various application functionality, networking functionality (e.g., one or more proxy servers), or the like, client devices for accessing such functionality, and control devices (e.g., controllers, programmable logic controllers, or the like) or other computing hardware for controlling various robots, machinery, and/or other devices associated with desired functionality (in an example context, hardware for an industrial plant). The networked devices may be connected to separate the networked devices into various device layers, for example based on the associated functionality of each layer. As illustrated, for example, the network architecture 400A includes a L4 device set (for example, public-facing networked devices), L3 device set (for example, cybersecurity protection server(s) configured for risk analysis and network architecture generation functionality), L3.5 device set (for example, proxy systems for securely connecting the L3 devices and the L4 devices), L2 device set (for example, application servers and communication servers for various functionality, and/or corresponding client devices for accessing such functionality and/or functionality of higher-layer devices), L1 device set (for example, including various controller-level devices controlled by other networked devices and/or monitored by one or more other networked devices), and L2.5 device set (for example, automation and/or configuration networked devices configured for controlling one or more of the L2 devices and/or L1 devices) Each of the networked devices may be connected in a particular configuration for ensuring functionality of the network architecture and sufficient cybersecurity protection against cyberattacks.

Specifically, as illustrated in FIG. 3A, the network architecture 300A includes a plurality of networked devices associated with various devices layers. The network architecture 300A may be configured with particular cybersecurity goals in mind. In this regard, the networked devices may be connected using various device connections. Particularly, the network architecture 300A includes networked devices 302A-302B and device connection 304A-304B. The network architecture 300A may be analyzed by an automatic network management system, for example embodied by the apparatus 200 separate from the network architecture 300A (e.g., embodied by a cloud service communicable with the network architecture 300A through one or more of the L4 devices), or included in or embodied by one or more devices of the networked devices of network architecture 300A (e.g., a L3 or L2 networked device, such as a risk manager system).

The apparatus 200 may process the network architecture 300A to determine an associated cybersecurity threat set. In this regard, the apparatus 200 may determine the network architecture 300A is vulnerable to one or more cyber-risks indicating vulnerability to corresponding cybersecurity attacks. For example, the apparatus 200 may determine the cyber-risks based on one or more rule sets that determine specific vulnerabilities are associated with networked devices of particular networked device types, networked device configurations (e.g., software, hardware, and/or firmware versions of various components of each networked device), and/or the device connections between the various networked devices of the network architecture 300A.

Further, the apparatus 200 may identify a improved network configuration data set based on the cybersecurity threat set and the network architecture 300A. The improved network configuration data set may include one or more device configurations to be include in existing networked devices, additional networked devices to be connected within the network architecture 300A, networked devices to be removed from the network architecture 300A, device connections to be removed from the network architecture 300A, and/or additional device connections to be included in the network architecture 300A. In this regard, the improved network configuration data set may include changes to the network architecture 300A to improve cybersecurity, such as by utilizing the improved network configuration data set.

For example, the apparatus 200B may generate the improved network architecture 300B illustrated in FIG. 3B based on the improved network configuration data set and the network architecture 300A. The improved network architecture 300B may include the various recommended sub-network configuration(s) of the improved network configuration data set. Specifically, for example, the improved network configuration data set may include data indicating addition of networked device 302C, networked device 302D, networked devices 302E-302G, and networked device 302H. The networked devices may each be associated with various functionality, for example networked device 302C provide functionality for securely connecting various networked devices of the improved network architecture 300B (for example, for connecting a sub-network formed by the L3 device set with another sub-network of the L2 device set and/or L2.5 device set), networked device 302D may provide a cellular network or L4 networking demilitarized zone with an Internet connection to one or more public networks, networked devices 302E-G configured for creating, managing, control, and/or other utilization of a virtual infrastructure, and/or networked device 302H for connecting particular networked devices of the L2.5 device set and/or L2 device set, such as a L2 switch. Additionally or alternatively, the improved network configuration data set may additionally include data indicating updating and/or addition of new device configurations associated with networked device 302A, for example new firmware device configuration installed to networked device 302A where the firmware device configuration is programmed for specific malware and/or threat protection.

Additionally or alternatively, the improved network configuration data set may include data indicating addition of one or more device connections. For example, the improved network configuration data set may additionally include data indicating addition of device connection 304D between one or more additional networked devices of the improved network architecture 300B (for example, networked device 302C and networked device 302H), and/or existing networked devices (for example, a L3 router and a networked device 302C). The improved network configuration data set may additionally include data indicating addition of device connections 304F and 304G to enable secure communications between the L2 devices and L2.5 devices via corresponding switch devices. It should be appreciated that additional connections may enable secure communication and/or structured communication (e.g., communication flow between devices through a desired set of device connections) between two newly added networked devices, between an existing networked device and a newly added networked device, or between two existing networked devices.

Additionally or alternatively, the improved network configuration data set may include data indicating removal of one or more networked devices and/or device connections. For example, the improved network configuration data set may additionally include data indicating removal of networked device 302B, for example where the networked device 302B is obsolete or otherwise associated with a cyber-risk. Additionally or alternatively, the improved network configuration data set may include data indicating removal of device connections 304A and/or 304B, again for being obsolete or associated with one or more cyber-risk(s).

The changes in device connections, networked devices, and/or device configurations, may resolve one or more of the cybersecurity threat set. In this regard, the improved network architecture 300B may provide improved cybersecurity as compared to the original network architecture 300A. The improved network architecture 300B may be generated as a particular data object, for example as structured data embodying a particular file format. In this regard, the improved network architecture 300B may be output, for example for further processing and/or provided for rendering to one or more displays. In an example context, the improved network architecture 300B may be provided for rendering to a display associated with a user to enable analysis by the user, and/or so that the user can take one or more steps to implement the improved network architecture 300B.

It should be appreciated that, in some embodiments, the improved network architecture 300B may be rendered to one or more interfaces, for example as depicted in FIG. 3B. Additionally or alternatively, in some embodiments, the apparatus 200 for example may configure the improved network architecture 300B such that upon rendering the improved network architecture 300B, interface elements associated with changes from the original network architecture 300A depicted in FIG. 3A are visually distinguished from other interface elements. For example, interface elements associated with a newly added networked device(s) may be associated with a particular color, text element, bordered (e.g., circled), highlighted, or otherwise visually distinguished. Additionally or alternatively, interface elements associated with networked devices to be removed may similarly be associated with a particular color (e.g., the same color as newly added networked device or another color), associated with a text element, bordered and/or crossed-out, highlighted, or otherwise visually distinguished. Interface elements associated with newly added device connections, device connections to be removed, and/or device configuration updates may similarly be visually distinguished. It should be appreciated that each interface element associated with a network architecture change may be visually distinguished in a different manner from the other network architecture changes to enable efficient and/or effective identification of such changes by a user analyzing the interface. In other embodiments, the network architecture is rendered without visually distinguishing any particular portions of the network architecture.

Example Processes for Automatic Improved
Network Architecture Generation

It should be appreciated that, in some embodiments, the operations of the flowcharts, or a combination of the operations herein, may form a computer-implemented method.

Further, in some embodiments, an apparatus (such as the apparatus 200) may be caused or otherwise configured to perform the computer-implemented method via various means, including computer-coded instructions stored to a memory of the apparatus and available to a processor for execution. In some embodiments, a non-transitory computer-readable storage medium is configured to store computer program code that, when executed by processing circuitry (such as a processor of a device, system, or apparatus) is configured to perform and/or execute the operations described.

Figure 4:
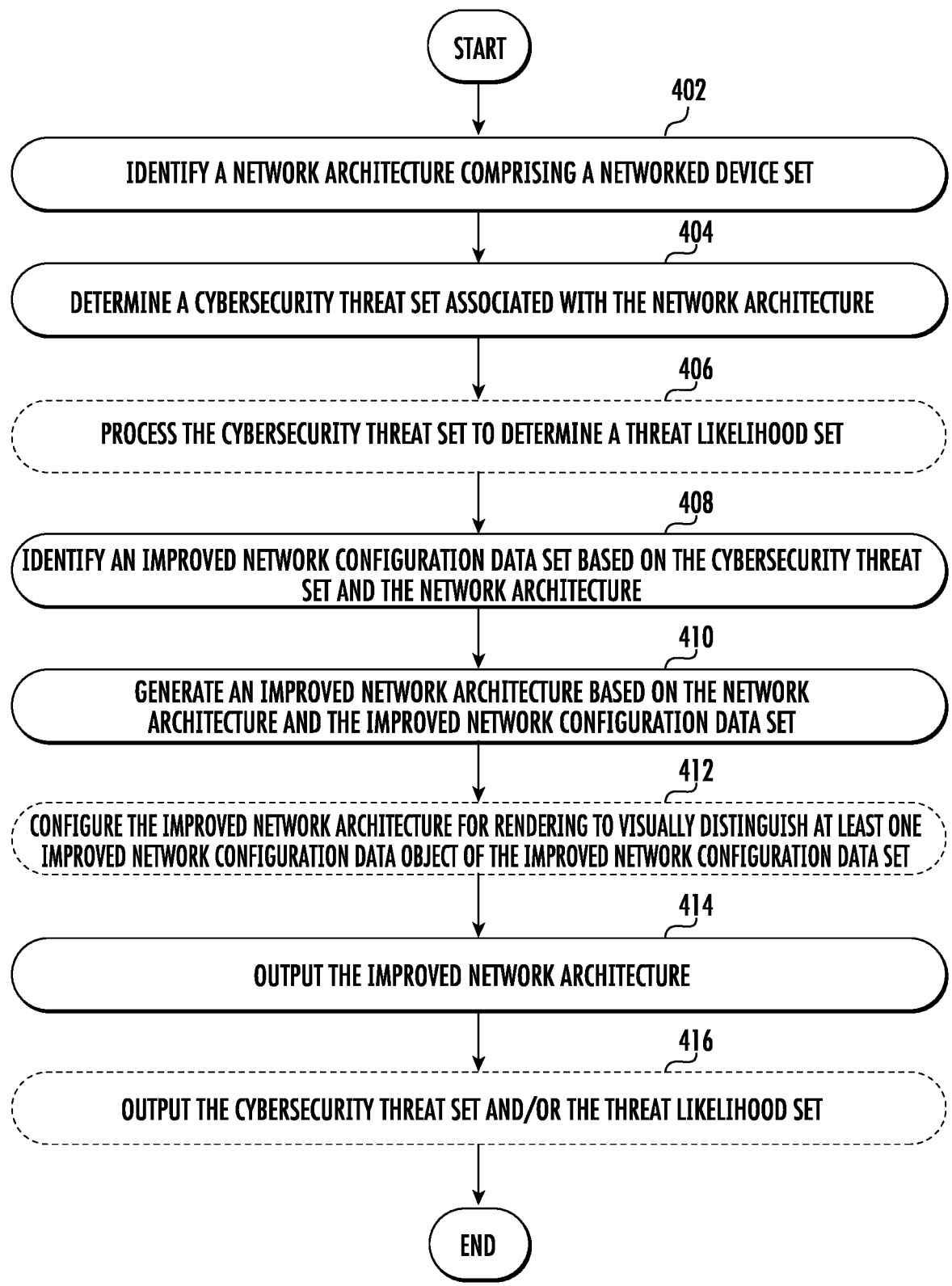

FIG. 4 illustrates a flowchart depicting example operations for automatic improved network architecture generation, in accordance with at least some embodiments of the present disclosure. In this regard, in some embodiments, the operations depicted are performed by a specially configured client device, for example embodied by the apparatus 200. The apparatus 200 may be in communication with one or more other devices, for example a networked device set embodying a particular network architecture. In some embodiments, the apparatus 200 may be included in the network architecture. In other embodiments, the apparatus 200 may a remote device from the network architecture, for example a cloud system configured to communicate with one or more devices of the network architecture via a communications network (e.g., the Internet).

The depicted process begins at block 402. At block 402, the apparatus 200 includes means, such as architecture management module 210, communications module 208, input/output module 206, processor 202, and/or the like, or a combination thereof, configured to identify a network architecture comprising a networked device set. In some embodiments, the apparatus 200 may be configured to identify the network architecture by querying for networked devices associated with an accessible communications network. In this regard, the apparatus 200 may be associated with various accessible communications networks (e.g., a WLAN, a LAN, a PAN, or the like), each associated with a different network architecture, which may have one or more shared networked devices or entirely distinct networked device sets. The apparatus 200 may query the networked devices forming a particular accessible communications network, and utilize response data to identify the network architecture. For example, where the apparatus 200 is communicable with a communications network the apparatus 200 may be configured to query a networked device for its device configurations, device connections, and/or other information for identifying the networked device, its configurations, and/or connections. The apparatus 200 may query such information from the remaining networked devices of the network architecture, directly or indirectly through one or more switches, routers, and/or other networked devices, for all remaining networked devices associated with the accessible communications network.

In other embodiments, the apparatus 200 may be configured to identify the network architecture by receiving a structured data object embodying the network architecture. The apparatus 200 may receive the structured data object from another system configured to query the networked devices embodying a network architecture, and provide response data as the structured data object representing the network architecture. For example, in one example context, the apparatus 200 may receive the structured data object from a requestor system configured to communicate with an internal communications network representing the network architecture, where the requestor system transmitted a request to the apparatus 200 for generation of an improved network architecture. The apparatus 200 may receive the request including the structured data object representing the network architecture, for example, which may be parsed and/or extracted for further processing. The requestor system may be a part of, or communicable with at least one sub-system that is a part of, an internal communications network that utilizes the networked device set embodying the network architecture, for example.

In yet other embodiments, the apparatus 200 may identify the network architecture by receiving the structured data object representing the network architecture in response to user interaction. In some such embodiments, the apparatus 200 may receive and process user interaction data indicating existence of a networked device, user interaction data indicating device configurations of existing networked devices, and/or user interaction data indicating device connections between each networked device. Additionally or alternatively, the apparatus 200 may receive user interaction data indicating submission of all networked devices, device configurations, and/or device connections, and the apparatus 200 may, in response to the submission, receive the structured data object representing the network architecture. In other embodiments, a user may interact with another device (e.g., a client device or another system communicable with a local network) to input and submit the network architecture to the apparatus 200. In some embodiments, to receive the user interaction data for inputting the networked devices, device configurations, and/or device connections, the apparatus 200 may provide one or more interfaces for rendering to a display associated with a particular user or client device. For example, the apparatus 200 may provide a web interface configured with interface elements to receive such user interaction data and perform corresponding actions for inputting the corresponding information.

At block 404, the apparatus 200 includes means, such as cybersecurity management module 212, communications module 208, input/output module 206, processor 202, and/or the like, or a combination thereof, configured to determine a cybersecurity threat set associated with the network architecture. The apparatus 200 may identify vulnerabilities in the network architecture based on the included networked devices of the networked device set, device configurations associated with the networked devices of the networked device set, or device connections between the networked devices of the networked device set. In some embodiments, the apparatus 200 may access, retrieve, or otherwise utilize an architecture threat rule set to determine the cybersecurity threat set associated with the network architecture. The architecture threat rule set may include one or more business rules automatically identified by the apparatus 200 or another system, or business rules input by a user, for example a cybersecurity expert configuring the apparatus 200. In some embodiments, the apparatus 200 may be configured to maintain the architecture threat rule set, for example by retrieving updates to the architecture threat rule set upon user request (e.g., an update request), or at predetermined timestamp intervals (e.g., hourly, daily, weekly, monthly, semi-annually, annually, or the like). It should be appreciated that, in some embodiments, the architecture threat rule set may include data retrieved from various different systems. For example, the apparatus 200, directly or indirectly through one or more other systems such as a cloud system for updating the architecture threat rule set, may communicate with one or more device vendor systems and/or device manufacturer systems to receive architecture threat rule data for networked device types.

In some embodiments, one or more architecture threat rule sets include computing logic and/or instruction sets for determining whether the network architecture is associated with a mismatch or misconfiguration with one or more expected networked devices configured based on certain device configurations and/or device connections. In some such embodiments, a subset of the architecture threat rule set may be applied to each networked device of the networked device set. For example, a first subset of networked devices (such as endpoint devices) may be associated with an endpoint security risk rule set, and a second networked device subset (such as all devices, or non-endpoint networked devices) devices may be associated with a network security risk rule set. An example endpoint security risk rule set may include instructions and/or computing logic for detecting (1) an authentication failure, (2) disabled AV functionality, (3) out-of-date or uninstalled antivirus packages, (4) antivirus identified potential threat data, (5) antivirus identified threat data, (6) antivirus warning data, (7) initiated application white listing (AWL) policy change(s) data, (8) AWL identified threat file data, (9) controller application image downgrade data, (10) controller boot image downgrade (11) controller high computing resource usage (e.g., indicating usage of CPU resources, GPU resources, networking resources, or other computing resources above a certain threshold), (12) max computing resource threshold reached, (13) controller image mismatch, (14) outdated DAT data (for example, associated with an antivirus software package), or a combination thereof. An example network security risk rule set may include instructions and/or computing logic for detecting (1) a new device connected and/or plugged into the network device (e.g., a peripheral device or a detachable storage device such as a USB storage device), (2) an active but unused port on the networked device, (3) high network bandwidth utilization (e.g., network bandwidth utilization above a predetermined or dynamically determined threshold), (4) high input error data (e.g., a high percentage of input errors associated with the networked device, for example above a predetermined or dynamic error threshold), (5) high output error data (e.g., a high percentage of output errors associated with the networked device, for example above a predetermined or dynamic error threshold), (6) an inherent network security threat level, (7) an inherent network security vulnerability level, (8) loss of connectivity and/or power by a networked device (e.g., detecting a networked device going offline), or the like, or a combination thereof. It should be appreciated that various rules may be developed for detecting, or otherwise identifying, various properties associated with the networked device and/or device connections of a particular network architecture, for example where each rule may be embodied by one or more computing instructions sets and/or computing logic.

In this regard, embodiments may identify a network device type for a networked device that the embodiment is processing, and/or apply a particular rule set based on the network device type. Additionally or alternatively, in some embodiments, a subset of networked devices may be used to identify a rule set, and/or a particular rule set may be applied based on the subset of networked devices. In this regard, it should be appreciated that each rule may be designed for analyzing one or more vulnerabilities with respect to a particular network device, or vulnerabilities with respect to a subset of networked devices (e.g., forming a particular sub-architecture). At optional block 406, the apparatus 200 includes means, such as cybersecurity management module 212, communications module 208, input/output module 206, processor 202, and/or the like, or a combination thereof, configured to process the cybersecurity threat set to determine a threat likelihood set. The threat likelihood set may include threat likelihood data associated with each of the cybersecurity threats included in the cybersecurity threat set. The threat likelihood data may represent a probability of a cyberattack occurring associated with the corresponding cybersecurity threat. The apparatus 200 may be configured to maintain threat likelihood data associated with each network threat representing a cybersecurity vulnerability, for example by receiving and/or processing data associated with cybersecurity attacks. Alternatively or additionally, in some embodiments, the apparatus 200 may be configured to determine a threat likelihood set for each particular cybersecurity threat, or for a subset of the cybersecurity threat set, based on one or more business rules created by one or more users.

At block 408, the apparatus 200 includes means, such as architecture management module 210, cybersecurity management module 212, communications module 208, input/output module 206, processor 202, and/or the like, or a combination thereof, configured to identify an improved network configuration data set based on the cybersecurity threat set and the network device architecture. In some embodiments, the improved network configuration data set includes data representing changes to be made to the network architecture to resolve the vulnerabilities, represented by the cybersecurity threat set, associated with the network architecture. The improved network configuration data set may include one or more improved network configuration data objects, for example data objects representing additional networked devices to include in the network architecture, device connections to remove between networked devices of the network architecture, device connections to remove from the network architecture, networked devices to remove from the network architecture, device configurations to update for one or more networked devices in the network architecture, or any combination thereof. The apparatus 200 may access, retrieve, or otherwise utilize an threat solution rule set to determine the improved network configuration data set for a particular network architecture. The threat solution rule set may include one or more business rules automatically identified by the apparatus 200 or another system, or business rules input by a user, for example a cybersecurity expert configuring the apparatus 200. In some embodiments, the apparatus 200 may be configured to maintain the threat solution rule set, for example by receiving updates upon user request or at pre-determined timestamp intervals. It should be appreciated that, in some embodiments, the threat solution rule set may include data retrieved from various systems, including device vendor systems, device manufacturer systems, or the like.

In some embodiments, the apparatus 200 may maintain a rule set including a combination of one or more of the above-described rule sets. For example, the apparatus 200 may maintain a rule set that includes an architecture threat rule set for identifying vulnerabilities associated with a particular network architecture, and/or a threat likelihood business rule set including one or more threat likelihood business rule for each vulnerability, and/or a threat solution rule set including one or more threat solution rule data object(s) associated with each vulnerability. In this regard, the single rule set may be used in each of the above steps for linking determined and/or identified data for efficient processing.

At block 410, the apparatus 200 includes means, such as architecture management module 210, cybersecurity management module 212, communications module 208, input/output module 206, processor 202, and/or the like, or a combination thereof, configured to generate an improved network architecture. In some embodiments, the apparatus 200 generates the improved network architecture based on the network architecture and/or the improved network configuration data set. For example, the improved network architecture may represent the network architecture with implementations of the changes represented by the improved network configuration data set. In this regard, the improved network architecture may include one or more additional networked device(s) and/or device connection(s), removed networked device(s) and/or device connection(s), and/or one or more updated networked devices including updated device configuration(s) (e.g., software, hardware, and/or firmware configurations).

In some embodiments, the apparatus 200 generates the improved network architecture as a structured data object interpretable by the apparatus 200 and/or one or more associated systems, for example a requestor system. The structured data object may be embodied in a particular custom or known file format that represents the improved network architecture in a manner such that the improved network architecture can be reconstructed based on the structured data object. In one example context, the structured data object may be embodied by a document configured based on the extensible markup language (XML) format, such that each networked device, device connection, and device connection, or any combination thereof, is represented as an element of the XML document. In other embodiments, the improved network architecture is represented by a structured data object embodied in a human-readable format, a machine-readable format, or both.

At optional block 412, the apparatus 200 includes means, such as architecture management module 210, communications module 208, input/output module 206, processor 202, and/or the like, or a combination thereof, configured to configure the improved network architecture for rendering to visually distinguish at least one improved network configuration data object of the improved network configuration data set. In some such embodiments, the apparatus 200 may mark specific data within the improved network architecture as associated with an improved configuration data object of the improved network configuration data set. For example, the apparatus 200 may set a bit flag or other indicator that represents the data is associated with a change from the original network architecture. In other embodiments, the apparatus 200 may be configured to set one or more rendering settings associated with the improved network architecture to cause each improved network configuration data object to be visually distinguished when rendered to the apparatus 200 or another system (e.g., a requestor system).

At block 414, the apparatus 200 includes means, such as architecture management module 210, communications module 208, input/output module 206, processor 202, and/or the like, or a combination thereof, configured to output the improved network architecture. In some embodiments, output means causing rendering to a display embodied in or associated with the apparatus 200, or transmitting to a networked device to cause rendering of the outputted data. In other embodiments, output means further processing, or transmitting to a networked device to cause further processing of the outputted data. In some embodiments, the apparatus 200 outputs the improved network architecture for rendering. It should be appreciated that the apparatus 200 may, in some embodiments, include a display to which the improved network architecture may be output for rendering.

In other embodiments, the apparatus 200 may be in communication with any of a number of client devices where the improved network architecture may be rendered. Further, it should be appreciated that a network architecture may include any number of client devices at any number of layers, and that the apparatus 200 may output the improved network architecture to such client device(s), directly or indirectly, to cause rendering to the client device(s). In this regard, for example, the apparatus 200 may output the improved network architecture as described below with respect to FIG. 5. In other embodiments, the apparatus 200 outputs the improved network architecture for further processing. For example, the apparatus 200 may output the improved network architecture to another component and/or sub-module of the apparatus 200 for further processing, or output the improved network architecture by transmitting the improved network architecture to another system (for example, a requestor system) for further processing.

At optional block 416, the apparatus 200 includes means, such as architecture management module 210, communications module 208, input/output module 206, processor 202, and/or the like, or a combination thereof, configured to output the cybersecurity threat set and/or the threat likelihood set. In this regard, the cybersecurity threat set and/or the threat likelihood set may be output for rendering, for example in one or more interfaces associated with the improved network architecture. For example, the improved network architecture may be rendered such that each changed networked device, device configuration, and/or device connection is rendered associated with the corresponding cybersecurity threat and/or threat likelihood data, such that a user may analyze the vulnerability resolved by the change. Alternatively or additionally, the apparatus 200 may output the cybersecurity threat set and/or the threat likelihood set by transmitting the cybersecurity threat set and/or the threat likelihood set for further processing by one or more other systems.

FIG. 5 illustrates another flowchart depicting additional example operations for automatic improved network architecture generation, specifically to output an improved network architecture for rendering. In this regard, in some embodiments, the operations depicted may be similarly performed by the automatic network management system, for example embodied by the apparatus 200. The process depicted in FIG. 5 may begin after one or more blocks of the process depicted with respect to FIG. 4, and/or is performed additional and/or alternative to one or more blocks depicted with respect to FIG. 4. In an example context, the process may begin after execution of block 412, and/or may be performed as block 414, such that flow returns to optional block 416 after execution of the operations depicted with respect to FIG. 4. In other embodiments, flow ends after the process depicted in FIG. 5.

In some embodiments, FIG. 5 begins at block 502A. At block 502A, the apparatus 200 includes means, such as architecture management module 210, input/output module 206, processor 202, and/or the like, or a combination thereof, configured to cause rendering of the improved network architecture to a display. In some embodiments, the display may be a monitor device, touch screen, projector, screen, or the like. The device may be integrated into the apparatus 200, for example an integrated touchscreen display, or separate from the apparatus 200. To cause rendering of the improved network architecture to the display, the apparatus 200 may configure and/or otherwise generate signals embodying the improved network architecture to the display.

In other embodiments, FIG. 5 begins at block 502B. In some embodiments, the apparatus 200 performs both blocks 502A and 502B, for example in sequence or in parallel. At block 502B, the apparatus 200 includes means, such as architecture management module 210, communications module 208, input/output module 206, processor 202, and/or the like, or a combination thereof, configured to transmit the improved network architecture to a requestor system for rendering. In this regard, the improved network architecture may be rendered to a display of the requestor system. In some embodiments, the apparatus 200 may transmit the improved network architecture to the requestor system over one or more communications networks. In an example context, the requestor system may be a client device configured to request functionality from the apparatus 200. For example, in some embodiments, the requestor system is a networked device of a network apparatus embodying an internal network. In other embodiments, the requestor system is a networked device communicable with the apparatus 200 over a public network, such as the Internet.

Figure 6A:
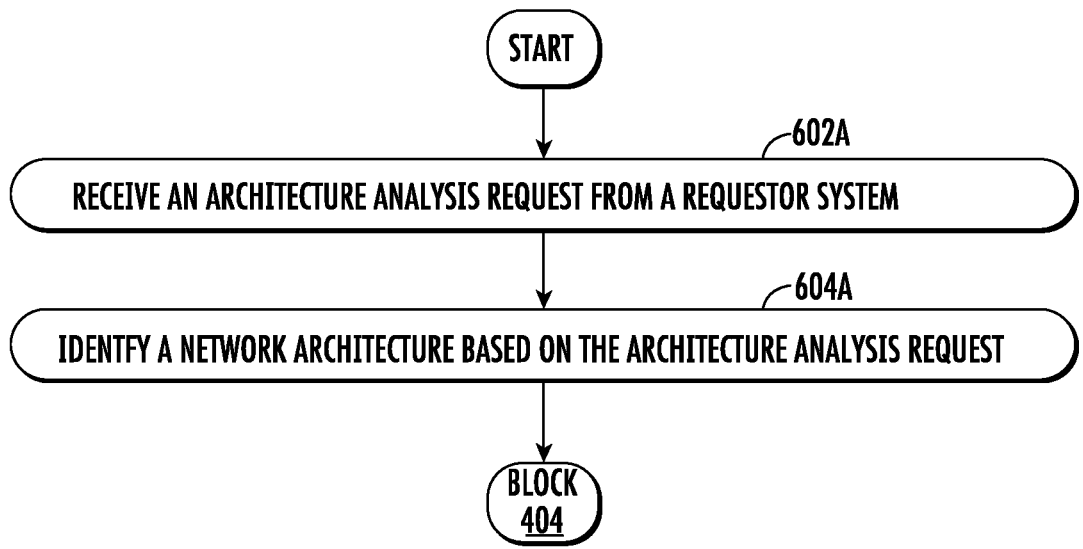

FIG. 6A illustrates another flowchart depicting additional example operations for automatic improved network architecture generation, specifically to identify the network architecture comprising a networked device set. In this regard, in some embodiments, the operations depicted may be similarly performed by the automatic network management system, for example embodied by the apparatus 200. The process depicted in FIG. 6A may begin after one or more blocks of the process depicted with respect to FIG. 4, and/or is performed additional and/or alternative to one or more blocks depicted with respect to FIG. 4. In an example context, the process may begin the process of FIG. 4, and/or may be performed as block 402, such that flow returns to block 404 after execution of the operations depicted with respect to FIG. 4. In other embodiments, flow ends after the process depicted in FIG. 6A.

At block 602A, the apparatus 200 includes means, such as cybersecurity management module 212, architecture management module 210, communications module 208, input/output module 206, processor 202, and/or the like, or a combination thereof, configured to receive an architecture analysis request from a requestor system. The requestor system may be embodied by a client device, or an associated networked device, configured to request functionality from the apparatus 200. In some embodiments, the apparatus 200 is a remote and/or cloud device associated with the requestor system, which may be a L4 device associated with a network architecture embodying an internal network. In this regard, a user may originate the architecture analysis request from a client device, which is transmitted to the apparatus 200 via the requestor system to improve network security (e.g., through using a networking demilitarized zone, proxy system, and/or the like). In other embodiments, for example where the apparatus 200 and requestor system are both associated with a network architecture embodying an internal network, the requestor system may communicate directly with the apparatus 200 or indirectly through other networked devices of the network architecture.

The architecture analysis request may include various information associated with identifying and/or processing a particular network architecture associated with the request. For example, in some embodiments, the architecture analysis request may include structured data representing a network architecture to be processed. In some embodiments, the structured data embodying the network architecture may be automatically identified by the requestor system or an associated device (for example, a client device communicable with the requestor system). Alternatively, the structured data may be input by a user of the requestor system or an associated device (for example, input via user interaction with a client device). Additionally or alternatively, the architecture analysis request may include various data associated with processing the network architecture, for example one or more rule sets to be used for processing the network architecture, identifying cybersecurity threats, and/or corresponding threat likelihood(s) or improved network configuration data object(s).

At block 604A, the apparatus 200 includes means, such as cybersecurity management module 212, architecture management module 210, communications module 208, input/output module 206, processor 202, and/or the like, or a combination thereof, configured to identify a network architecture based on the architecture analysis request. In some embodiments, the apparatus may be configured to parse and/or extract the network architecture from the architecture analysis request. Further, the apparatus 200 may process the parsed and/or extracted data to identify the network architecture. For example, the architecture analysis request may include a structured data object representing the network architecture, such that the apparatus 200 parses the structured data object from the architecture analysis request and processes the structured data object to identify the network architecture for further processing. In this regard, upon identifying the network architecture (e.g., from one or more parsing, extracting, and/or further processing actions), the identified network architecture may be used in one or more other blocks, for example those depicted with respect to FIG. 4.

Figure 6B:
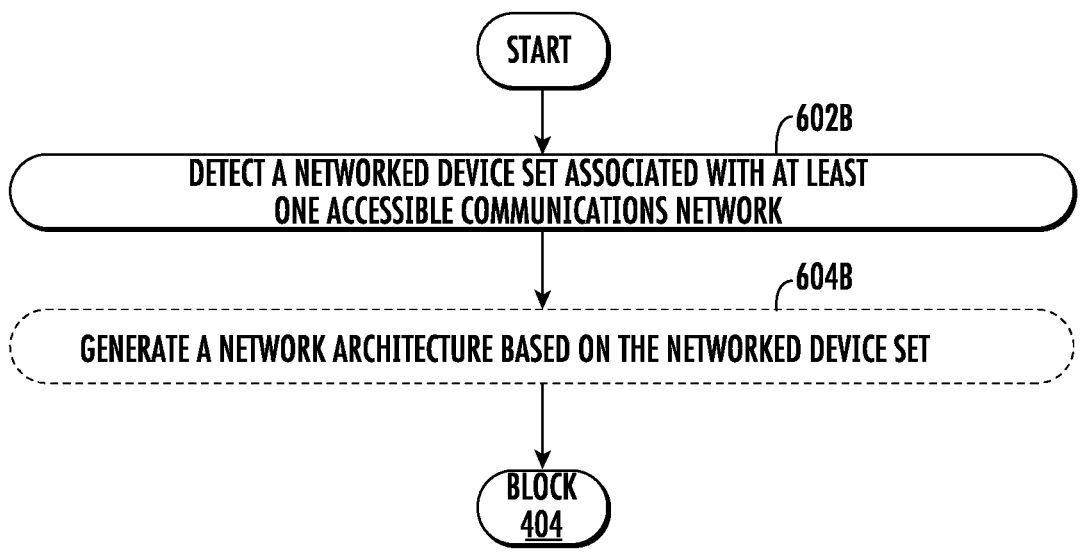

FIG. 6B illustrates another flowchart depicting additional example operations for automatic improved network architecture generation, specifically to identify the network architecture comprising a networked device set. In this regard, in some embodiments, the operations depicted may be similarly performed by the automatic network management system, for example embodied by the apparatus 200. The process depicted in FIG. 6B may begin after one or more blocks of the process depicted with respect to FIG. 4, and/or is performed additional and/or alternative to one or more blocks depicted with respect to FIG. 4. In an example context, the process may begin the process of FIG. 4, and/or may be performed as block 402, such that flow returns to block 404 after execution of the operations depicted with respect to FIG. 4. In other embodiments, flow ends after the process depicted in FIG. 6B.

At block 602B, the apparatus 200 includes means, such as cybersecurity management module 212, architecture management module 210, communications module 208, input/output module 206, processor 202, and/or the like, or a combination thereof, configured to detect a networked device set associated with at least one accessible communications network. The networked device set may include any number of networked devices forming the accessible communications network. In some embodiments, the apparatus 200 detects the networked device set by querying one or more networked devices in direct communication with the apparatus. For example, the apparatus 200 may query a second networked device in direct communication with the apparatus 200 for all device connections, device configurations, and/or other information associated with the networked device. In some such embodiments, the query may similarly cause the second networked device to perform the same query for all other networked devices connected to the second networked device, and so on. In this way, one or more queries may be performed in a recursive manner for each networked device, such that in response to the original query, the apparatus 200 receives response data for the queried networked device and all other networked devices communicable with the queried network device.

In other embodiments, in response to a query, the apparatus 200 is configured to receive response data only associated with the queried networked device. The response data from a particular networked device may include device connection data, other networked devices communicable with the queried networked device, and/or other networked device information associated with the queried network device. In some such embodiments, the apparatus 200 may utilize this response data to directly query one or more other networked devices identified by the response data (e.g., indicating the networked devices are part of the accessible communications network) and that have not been previously queried. In this regard, the apparatus 200 may detect the full networked device set when all networked devices identified by the response data of various requests have been queried, and corresponding response data received.

It should be appreciated that, in some embodiments, one or more software, hardware, and/or firmware tools are utilized to detect the networked device set. In some embodiments, the apparatus 200 utilizes any combination of a variety of networked device detection algorithms and/or software implementations to detect the networked device set. For example, in some embodiments, the apparatus 200 utilizes one or more customized networked device detection algorithms and/or software implementations for identifying the networked device set and/or retrieving the current configuration data from each networked device of the networked device set. Alternatively or additionally, in some embodiments, the apparatus 300 is configured to utilize one or more known software applications for identifying the networked device set and/or retrieving the current configuration data from each networked device of the networked device set. For example, the apparatus 300 may include means configured to utilize, without limitation, one or more of Microsoft Corp.'s PowerShell™, Windows™ Management Instrumentation ("WMI"), Dell Inc's OpenManage™ Server Administrator ("OMSA"), OpenManage™ Client Instrumentation ("OMCI"), one or more Simple Network Management Protocol ("SNMP") agent(s), one or more Open Platform Communications (for example, Object Linking and Embedding for Process Control) ("OPC") Agent(s), and/or the like. In this regard, for example, the apparatus 200 may retrieve device configuration data using one or more SNMP agents for one or more switch devices, one or more OPC agents for one or more programmable logic controller or other controllers (including third-party controllers and/or off-the-shelf controller devices), and/or other networked devices such as L1 networked devices, and/or one or a combination of OMSA and OMCI fetching mechanisms for one or more server devices, client devices, and/or other personal computing devices.

In some embodiments, the networked device set may include various information associated with each networked device. For example, the networked device set may include a networked device data object including at least one or more of (1) networked device identification information (e.g., one or more identifiers associated with the networked device, including software identifiers, serial number information, network address identifier information, and/or the like), (2) device configuration data for the networked device (e.g., software configuration(s), hardware configuration(s), firmware configuration(s), or any combination thereof), (3) device connection data for the networked device, and/or any combination thereof. In some such embodiments, at optional block 604B the apparatus 200 includes means, such as cybersecurity management module 212, architecture management module 210, communications module 208, input/output module 206, processor 202, and/or the like, or a combination thereof, configured to generate a network architecture based on the networked device set. In some such embodiments, the apparatus 200 is configured to process the networked device set to generate the network architecture. In this regard, the apparatus 200 may utilize the networked device set to generate the network architecture representing all networked devices as connected and configured based on the networked device set. In other embodiments, the networked device set may be structured such that it embodies the network architecture without further processing. The network architecture may be embodied by data configured to be processed to identify specific sub-networks, device connections (either direct device connections or indirect device connections through one or more intermediate network devices), networked device configurations, and/or derived information therefrom associated with one networked device or multiple networked devices. In this regard, upon generating and/or otherwise identifying the network architecture, the network architecture may be used in one or more other blocks, for example the remaining blocks depicted with respect to FIG. 4.

Figure 7:
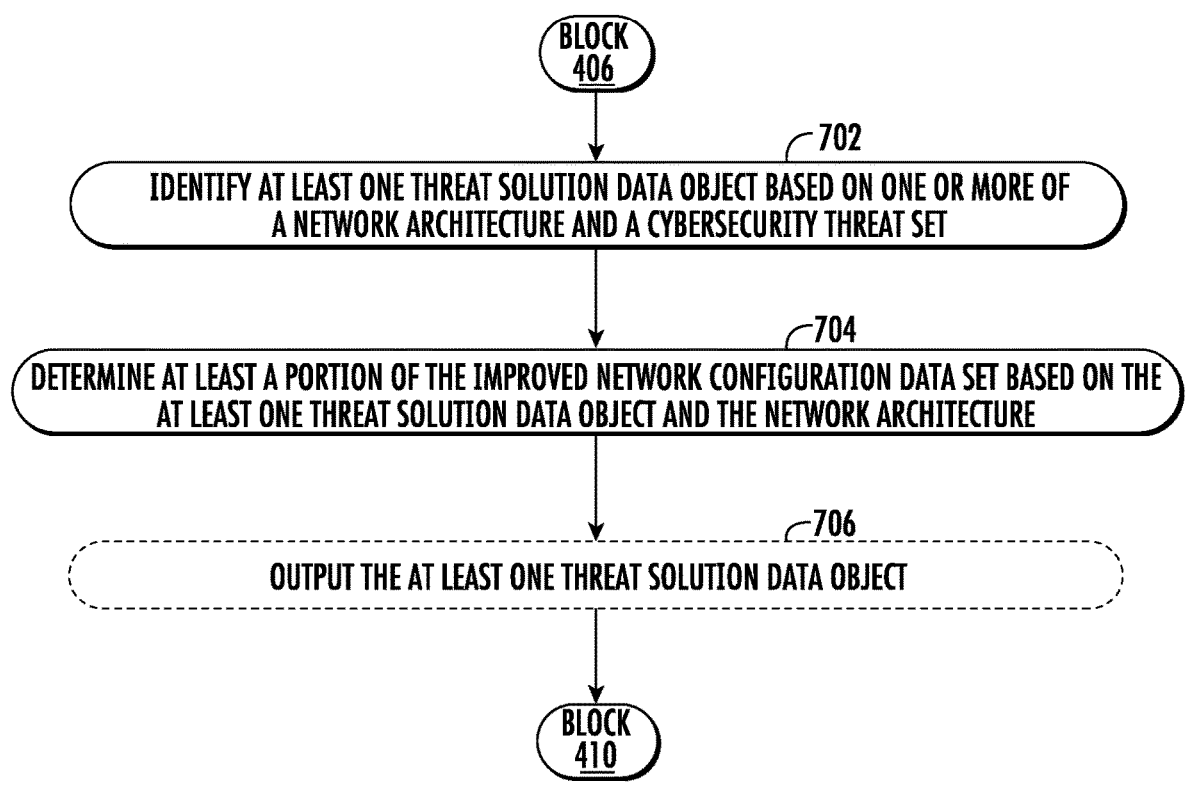

FIG. 7 illustrates another flowchart depicting additional example operations for automatic improved network architecture generation, specifically to identify an improved network configuration data set based on the cybersecurity threat set and the network architecture. In this regard, in some embodiments, the operations depicted may be similarly performed by the automatic network management system, for example embodied by the apparatus 200. The process depicted in FIG. 7 may begin after one or more blocks of the process depicted with respect to FIG. 4, and/or is performed additional and/or alternative to one or more blocks depicted with respect to FIG. 4. In an example context, the process may begin after block 408 of FIG. 4, and/or may be performed as block 408, such that flow returns to block 410 after execution of the operations depicted with respect to FIG. 7.

At block 702, the apparatus 200 includes means, such as cybersecurity management module 212, architecture management module 210, communications module 208, input/output module 206, processor 202, and/or the like, or a combination thereof, configured to identify at least one threat solution data object based on one or more of a network architecture and a cybersecurity threat set, or a combination thereof. In some such embodiments, the apparatus 200 may be configured to retrieve a threat solutions set including one or more threat solution data object(s). The threat solution data object(s) may each be linked to one or more identified cybersecurity threat(s), for example where each threat solution data object provides data associated with protecting a network architecture against the associated vulnerability. For example, in some such embodiments, each threat solution data object may provide one or more business rule set(s) for use in determining whether a network architecture is protected against the vulnerability represented by a cybersecurity threat linked to the corresponding threat solution data object. The business rules set may, for example, be embodied by data representing required networked devices to secure against the associated cybersecurity threat, corresponding device configurations for one or more networked devices to secure against the associated cybersecurity threat, and/or device connection data to secure against the associated cybersecurity threat, or a combination thereof. For example, in some embodiments, the business rule set may represent data embodying a particular sub-network of specially configured networked devices that, if present in a network architecture at one or more particular locations (e.g., at L3.5 or L3 in the network architecture), would protect against and/or reduce the likelihood of the associated cybersecurity threat.

In this regard, the apparatus 200 may identify the at least one threat solution data object by identifying a threat solution data object for each cybersecurity threat in the cybersecurity threat set. Additionally or alternatively, the apparatus 200 may identify at least one threat solution data object based on the cybersecurity threat set and the network architecture. For example, in some such embodiments, the apparatus 200 may identify a threat solution data object for a cybersecurity threat based on the networked devices, device configurations, and/or device connections already implemented in the network architecture. The apparatus 200 may further improve computing resource utilization efficiency, and cost or time efficiency associated with implementing an improved network architecture, by identifying threat solution data object(s) that minimize the required changes to the existing network architecture. In an example context, a given cybersecurity threat may be associated with a plurality of threat solution data objects, and the identified threat solution data object may minimize the number of changes from the existing network architecture. In another example context, multiple cybersecurity threats may each be associated with a plurality of threat solution data objects, and the identified threat solution data object(s) associated with each cybersecurity threat may minimize the number of changes from the existing network architecture (e.g., threat solution data object(s) may be chosen that represent requirements of shared networked devices, device configurations, and/or device connections for resolving multiple cybersecurity threats, such that multiple independent solutions do not need to be implemented). In this regard, the apparatus 200 may be configured to pick the best solution or combination of solutions, such as one or more device configurations or particular networked device connections forming a particular subnetwork, based on one or more factors (e.g., maximizing protection against vulnerabilities), or a weighted combination of factors (e.g., maximizing protection against vulnerabilities within a projected cost associated with the changes to be implemented).

Additionally or alternatively, in some embodiments, threat solution data object(s) may be identified based on the changes represented by the business rules therein. For example, threat solution data object(s) including data representing addition of new networked devices may be weighted as less preferred compared to threat solution data object(s) that are easier and/or less costly to implement (e.g., threat solution data object(s) including updates of device configurations only). In this regard, each threat solution data object may be identified based on its corresponding weight and/or combined weights for all cybersecurity threat(s) of the cybersecurity threat set.

At block 704, the apparatus 200 includes means, such as cybersecurity management module 212, architecture management module 210, communications module 208, input/output module 206, processor 202, and/or the like, or a combination thereof, configured to determine at least a portion of the improved network configuration data set based on the at least one threat solution data object and the network architecture. In this regard, the apparatus 200 may determine the improved network configuration data set including one or more improved network configuration data object(s) that embodies changes to the network architecture based on the at least one threat solution data object. Each improved network configuration data object may, for example, be represented by a second structured data object to be used in combination with the structured data object representing the network architecture. The second structured data object may be configured such that, when combined with the structured data object representing the network architecture, various data of the second structured data object is added to the structured data object representing the network architecture, replaces some of the structured data object representing the network architecture, or is removes data from the structured data object representing the network architecture. In this regard, the improved network configuration data set may be configured to be combined with the network architecture to generate the improved network architecture, for example at a later block in FIG. 4.

At optional block 706, the apparatus 200 includes means, such as cybersecurity management module 212, architecture management module 210, communications module 208, input/output module 206, processor 202, and/or the like, or a combination thereof, configured to output the at least one threat solution data object. In this regard, the at least one threat solution data object may be may be output for rendering, for example in one or more interfaces associated with a network architecture and/or improved network architecture corresponding to the improved network configuration data set. For example, the improved network configuration data set may be rendered alongside a corresponding cybersecurity threat set and/or an improved network architecture, such that a user may analyze what network changes represented in the improved network architecture resolve particular cybersecurity threats. Alternatively or additionally, the apparatus 200 may output the at least one threat solution data object by transmitting the at least one threat solution data object for further processing by one or more other systems. For example, the apparatus 200 may output the at least one threat solution data object by transmitting the at least one threat solution data object to a client device for rendering to a display associated with the client device.

Figure 8:
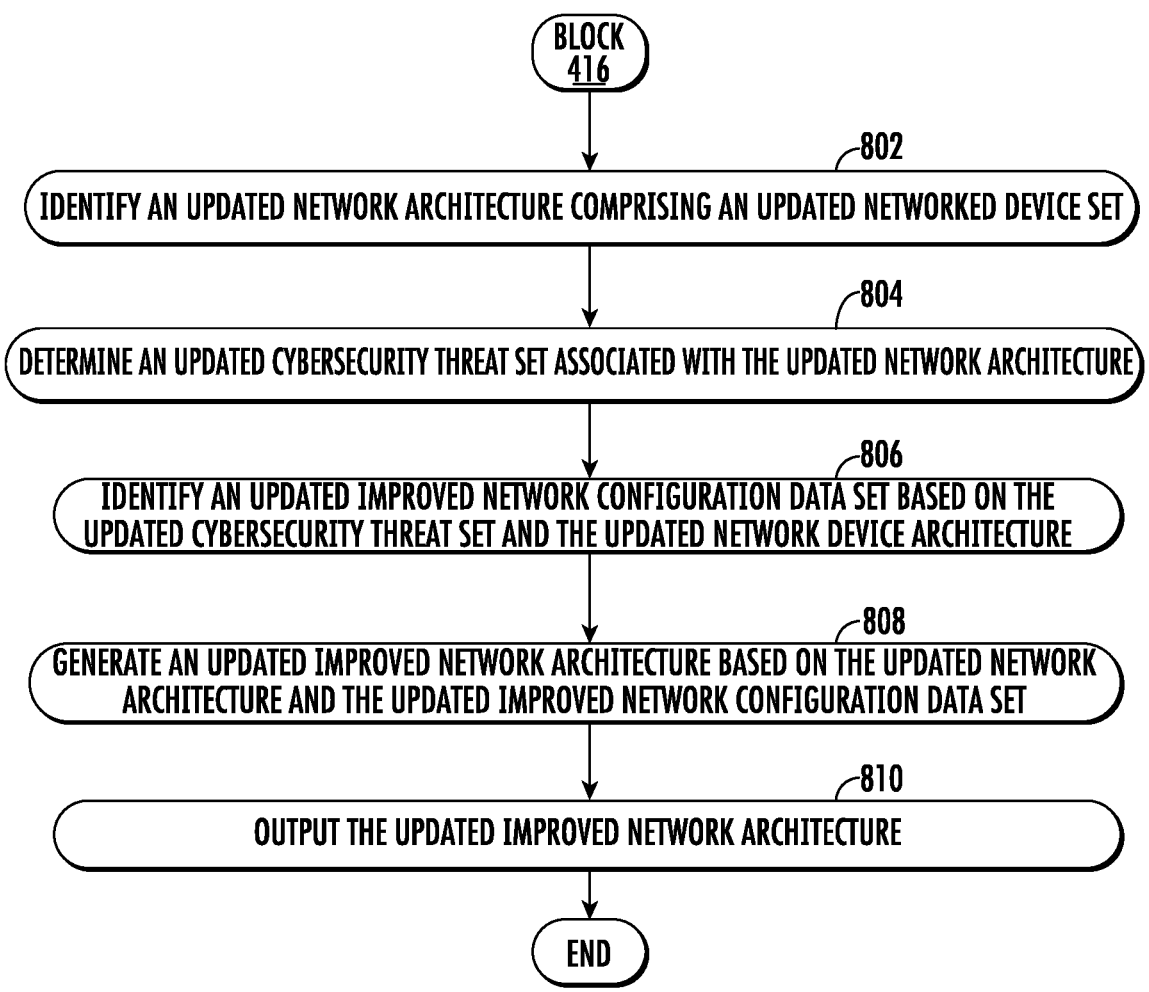

FIG. 8 illustrates another flowchart depicting additional example operations for automatic improved network architecture generation. In this regard, in some embodiments, the operations depicted may similarly be performed by the automatic network management system, for example embodied by the apparatus 200. The process depicted in FIG. 8 may begin after one or more blocks of the process depicted with respect to FIG. 4, and/or is performed additional and/or alternative to one or more blocks depicted with respect to FIG. 4. In an example context, the process may begin after block 416 of FIG. 4, and flow may end, or return to one or more blocks depicted with respect to FIG. 4, after execution of the operations depicted with respect to FIG. 8.

The depicted process begins at block 802. At block 802, the apparatus 200 includes means, such as architecture management module 210, communications module 208, input/output module 206, processor 202, and/or the like, or a combination thereof, configured to identify an updated network architecture comprising an updated networked device set. In this regard, the updated network architecture may represent the improved network architecture, for example detected after implementation of the improved network architecture automatically and/or by one or more user actions (e.g., physically connecting and/or disconnecting networked devices). In one example context, after a user performs one or more actions to change a networked architecture (for example, based on the improved network architecture), the apparatus 200 may receive subsequent user input requesting subsequent processing of the newly updated network architecture. For example, the apparatus 200 may receive a second architecture analysis request in response to user interaction with the apparatus 200, and/or a corresponding client device, where the second architecture analysis request indicates a request to process the updated network architecture.

In some embodiments, the apparatus 200 may be configured to identify the updated network architecture by querying for updated networked devices associated with an accessible communications network, which may have been the accessible communications network previously processed. The accessible communications network may be represented, or otherwise embodied by, the updated networked device set, which may include one or more newly included additional networked devices, and/or may have one or more networked devices removed compared to the networked device set associated with the original networked architecture (e.g., identified at block 402). Additionally or alternatively, in some embodiments, the updated network architecture includes one or more networked devices associated with one or more updated device configuration(s), for example updated software configuration(s), hardware configuration(s), and/or firmware configuration(s). It should be appreciated that, in some embodiments, the updated networked device set may include one or more unchanged networked devices.

In some embodiments, the apparatus 200 queries the updated networked devices forming the particular accessible communications network, and utilizes response data associated with the updated query to identify the updated network architecture. Additionally or alternatively, in other embodiments, the apparatus 200 may be configured to identify the updated network architecture by receiving a second structured data object embodying the updated network architecture. The apparatus 200 may receive the second structured data object from another system configured to query the networked devices embodying the updated network architecture, and provide response data as the second structured data object representing the updated network architecture. For example, in one example context, the apparatus 200 may receive the second structured data object from a requestor system configured to communicate with an internal communications network representing the updated network architecture, where the requestor system transmitted a request (e.g., an architecture analysis request) to the apparatus 200 for generation of an updated improved network architecture after updating of an original network architecture. The apparatus 200 may receive a second request including the second structured data object representing the updated network architecture, for example, which may be parsed and/or extracted for further processing.

In yet other embodiments, the apparatus 200 may identify the updated network architecture by receiving the structured data object representing the network architecture in response to a second user interaction. In some such embodiments, the apparatus 200 may receive and process second user interaction data indicating existence of updated networked devices, user interaction data indicating updated device configurations of existing updated networked devices, and/or user interaction data indicating updated device connections between each updated networked device. Additionally or alternatively, the apparatus 200 may receive user interaction data indicating submission of all updated networked devices, updated device configurations, and/or updated device connections, and the apparatus 200 may, in response to the submission, receive the updated structured data object representing the updated network architecture. In other embodiments, a user may interact with another device (e.g., a client device or another system communicable with a local network) to input and submit the updated network architecture to the apparatus 200. In some embodiments, to receive the second user interaction data for inputting the updated networked devices, updated device configurations, and/or updated device connections, the apparatus 200 may provide one or more interfaces for rendering to a display associated with a particular user or client device.

At block 804, the apparatus 200 includes means, such as cybersecurity management module 212, communications module 208, input/output module 206, processor 202, and/or the like, or a combination thereof, configured to determine an updated cybersecurity threat set associated with the updated network architecture. In this regard, the updated cybersecurity threat set may represent cybersecurity threats to which the updated network architecture remains vulnerable. Each cybersecurity threat may be identified based on one or more of the included networked devices of the updated networked device set, one or more of the device configurations associated with the updated networked devices of the networked device set, or device connections between the networked devices of the updated networked device set. It should be appreciated that, in some embodiments, an architecture threat rule set may be used to determine the updated cybersecurity threat set associated with the updated network architecture. The architecture threat rule set may be the same rule set utilized in one or more previous processing operations, for example in processing the original network architecture to determine corresponding cybersecurity threat(s) (e.g., at block 404). Alternatively, in some embodiments, an updated architecture threat rule set may be used to determine the cybersecurity threat set. In this regard, in some such embodiments, the apparatus 200 may identify, retrieve, or otherwise access the most up-to-date architecture threat rule set, such that the most cybersecurity threat(s) are determined associated with the updated network architecture, and thus can be resolved in a proposed updated improved network architecture.

At block 806, the apparatus 200 includes means, such as architecture management module 210, cybersecurity management module 212, communications module 208, input/output module 206, processor 202, and/or the like, or a combination thereof, configured to identify an updated improved network configuration data set based on the updated cybersecurity threat set and the updated network device architecture. In this regard, the updated improved network configuration data set may include data representing changes to be made to the updated network architecture to resolve the vulnerabilities, represented by the updated cybersecurity threat set, associated with the updated network architecture. For example, the data may represent one or more threat solution data object(s) identified associated with the updated network architecture. In some embodiments, the updated improved network configuration data set may include one or more improved network configuration data objects, for example each representing additional networked devices to include in the updated network architecture, additional device connections to include between networked devices of the updated network architecture and/or new networked devices to include, device connections to remove from the updated network architecture, networked devices to remove from the updated network architecture, device configurations to update for one or more networked devices in the updated network architecture, or any combination thereof. In some embodiments, the apparatus 200 may be configured to utilize a threat solution rule set, for identifying the updated improved network configuration data set. The threat solution rule set may be the same threat solution rule set to process the original network architecture, for example at one or more earlier blocks (e.g., at block 408). Alternatively, in some embodiments, an updated threat solution rule set may be used to identify the second updated improved network configuration data set. In this regard, in some such embodiments, the apparatus 200 may identify, retrieve, or otherwise access the most up-to-date threat solution rule set, such that the updated improved network configuration data set represents the most up-to-date solutions for resolving the cybersecurity threats of the updated cybersecurity threat set.

At block 808, the apparatus 200 includes means, such as architecture management module 210, cybersecurity management module 212, communications module 208, input/output module 206, processor 202, and/or the like, or a combination thereof, configured to generate an updated improved network architecture. In some embodiments, the apparatus 200 generates the updated improved network architecture based on the updated network architecture and/or the updated improved network configuration data set. In this regard, the updated improved network architecture may represent the updated network architecture with implementation of the changes represented by the updated improved network configuration data set. For example, the updated improved network architecture may include one or more additional networked device(s) and/or device connection(s), removed networked device(s) and/or device connection(s), and/or one or more networked devices including updated device configuration(s) (e.g., software, hardware, and/or firmware configurations). It should be appreciated that the updated improved network architecture may be generated as a second structured data object interpretable by the apparatus 200 and/or one or more associated systems, for example a requestor system. In this regard, the updated improved network architecture may be generated as a structured data object similarly to that of the improved network architecture generated at an earlier block (e.g., at block 410).

At block 810, the apparatus 200 includes means, such as architecture management module 210, communications module 208, input/output module 206, processor 202, and/or the like, or a combination thereof, configured to output the updated improved network architecture. In some embodiments, the apparatus 200 outputs the updated improved network architecture for rendering. In this regard, for example, the apparatus 200 may output the updated improved network architecture as described above with respect to FIG. 5. In other embodiments, the apparatus 200 outputs the updated improved network architecture for further processing. For example, the apparatus 200 may output the updated improved network architecture to another component and/or sub-module of the apparatus 200 for further processing, or output the updated improved network architecture by transmitting the updated improved network architecture to another system (for example, a requestor system) for further processing.

It should be appreciated that in some embodiments the process illustrated with respect to FIG. 8 is repeated any number of times. In this respect, a user may re-initialize the system (for example by transmitting one or more requests, such as an architecture analysis request) each time one or more changes are made to the network architecture. In this regard, the apparatus 200 may process the newly updated network architecture each time without requiring human expertise or requiring significant analysis time associated with human cybersecurity experts. In this regard, embodiments of the present disclosure enable any number of network architectures to be processed to identify vulnerabilities and generate corresponding improved network architectures without significant time or expense costs.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., a FPGA or an ASIC. The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A method comprising:
  receiving a network architecture analysis request from a requestor system, wherein the network architecture analysis request comprises structured data representative of a network architecture;
  identifying the network architecture by extracting the structured data from the network architecture analysis request, wherein the network architecture comprises one or more networked devices that are connected;

identifying a first subset of devices from amongst the one or more networked devices in the network architecture based on at least one of a type of the device in the first subset of devices, a functionality of the device in the first subset of devices, and a level associated with a network layer at which the device in the first subset of devices is configured to operate in the network architecture;

identifying from amongst a plurality of an architecture threat rule set, a first rule set applicable for the first subset of devices in the network architecture;

identifying from amongst the plurality of the architecture threat rule set, a second rule set applicable for a second subset of the devices in the network architecture different from the first subset of devices, wherein the second subset of devices are identified based on at least one of a type of the device in the second subset of devices, a functionality of the device in the second subset of devices, and a level associated with a network layer at which the device in the second subset of devices is configured to operate in the network architecture; and determining a solution to mitigate vulnerabilities associated with the first and second subset of devices in the network architecture, wherein the vulnerabilities are identified for the first and second subset of devices based on the first rule set and the second rule set respectively, wherein determining the solution to mitigate vulnerabilities associated with the first subset of devices in the network architecture comprises:

retrieving a set threat solution data objects, wherein each of the set of threat solution data objects is associated with a number f changes to the network architecture;

selecting a first threat solution data object from the set of threat solution data objects based on a determination that the first threat solution data is associated with a minimum number of changes to the network architecture of the set of threat solution data objects; and determining at least a portion of the solution to mitigate vulnerabilities associated with the first subset of device in the network architecture based on the first threat solution data object.

2. The method of claim 1 further comprising:
determining the solution to mitigate the vulnerabilities comprising changes to be made to the network architecture to resolve the vulnerabilities,
wherein the changes comprises removing a device from the one or more networked devices.

3. The method of claim 2, further comprising:
rendering the network architecture on a display,
wherein the rendering comprises visually distinguishing the changes made to the network architecture to resolve the vulnerabilities.

4. The method of claim 1 further comprising:
determining the solution to mitigate the vulnerabilities based on a weighted combination of factors,
wherein the factors comprises protection against vulnerabilities and a projected cost associated with changes to be implemented.

5. The method of claim 1, wherein the one or more threat solution data objects are retrieved based on requirements of at least one of: (i) shared networked devices, (ii) device configurations, and (iii) device connections.

6. The method of claim 1 further comprising:
determining the vulnerabilities being associated with firmware versions of the one or more networked devices.

7. A system comprising at least one processor and at least one non-transitory memory comprising program code, wherein the at least one non-transitory memory and the program code are configured to, with the at least one processor, cause the system to at least:

receive a network architecture analysis request from a requestor system, wherein the network architecture analysis request comprises structured data representative of a network architecture;

identify the network architecture by extracting the structured data from the network architecture analysis request, wherein the network architecture comprises one or more networked devices that are connected;

identify a first subset of devices from amongst the one or more networked devices in the network architecture based on at least one of a type of the device in the first subset of devices, a functionality of the device in the first subset of devices, and a level associated with a network layer at which the device in the first subset of devices is configured to operate in the network architecture;

identify a first rule set from amongst a plurality of an architecture threat rule set, the first rule set is applicable for the first subset of devices in the network architecture;

identify a second rule set from amongst the plurality of the architecture threat rule set and applicable for a second subset of devices in the network architecture, wherein the second subset of the devices are different from the first subset of devices, further the second subset of devices are identified based on at least one of a type of the device in the second subset of devices, a functionality of the device in the second subset of devices, and a level associated with a network layer at which the device in the second subset of devices is configured to operate in the network architecture; and determine a solution to mitigate vulnerabilities associated with the first and second subset of devices in the network architecture, wherein the vulnerabilities are identified for the first and second subset of devices based on the first rule set and the second rule set respectively, wherein to determine the solution to mitigate vulnerabilities associated with the first subset of devices in the network architecture comprises the at least one non-transitory memory and the program code being configured to, with the at least one processor, cause the system to further:

retrieve a set of threat solution data objects, wherein each of the set of threat solution data objects is associated with a number of changes to the network architecture;

select a first threat solution data object from the set of threat solution data objects based on a determination that the first threat solution data is associated with a minimum number of changes to the network architecture of the set of threat solution data objects, and determine at least a portion of the solution to mitigate abilities associated with the first subset of device in the network architecture based on the first threat solution data object.

8. The system of claim 7, wherein the at least one non-transitory memory and the program code are configured to, with the at least one processor, cause the system to further:
determine the solution to mitigate the vulnerabilities comprising changes to be made to the network architecture to resolve the vulnerabilities,
wherein the changes comprises removing a device from the one or more networked devices.

9. The system of claim 8, wherein the at least one non-transitory memory and the program code are configured to, with the at least one processor, cause the system to further:
render the network architecture on a display,
wherein the rendering comprises visually distinguishing the changes made to the network architecture to resolve the vulnerabilities.

10. The system of claim 7, wherein the at least one non-transitory memory and the program code are configured to, with the at least one processor, cause the system to further:
determine the solution to mitigate the vulnerabilities based on a weighted combination of factors,
wherein the factors comprises protection against vulnerabilities and a projected cost associated with changes to be implemented.

11. The system of claim 7, wherein the one or more threat solution data objects are retrieved based on (i) requirements of one or more of shared networked devices, (ii) device configurations, and/or (iii) device connections.

12. The system of claim 7, wherein the at least one non-transitory memory and the program code are configured to, with the at least one processor, cause the system to further:
determine the vulnerabilities being associated with firmware versions of the one or more networked devices.

13. A non-transitory computer-readable storage medium having computer program instructions thereon, the computer program instructions, in execution with one or more processors configured to:
receive a network architecture analysis request from a requestor system, wherein the network architecture analysis request comprises structured data representative of a network architecture;
identify the network architecture by extracting the structured data from the network architecture analysis request, wherein the network architecture comprises one or more networked devices that are connected;
identify a first subset of devices from amongst the one or more networked devices in the network architecture based on at least one of a type of the device in the first subset of devices, a functionality of the device in the first subset of devices, and a level associated with a network layer at which the device in the first subset of devices is configured to operate in the network architecture;
identify from amongst a plurality of an architecture threat rule set, a first rule set applicable for the first subset of devices in the network architecture;
identify from amongst the plurality of the architecture threat rule set, a second rule set applicable for a second subset of the devices in the network architecture different from the first subset of devices, wherein the second subset of devices are identified based on at least one of a type of the device in the second subset of devices, a functionality of the device in the second subset of devices, and a level associated with a network layer at which the device in the second subset of devices is configured to operate in the network architecture; and
determine a solution to mitigate vulnerabilities associated with the first and second subset of devices in the network architecture, wherein the vulnerabilities are identified for the first and second subset of devices based on the first rule set and the second rule set respectively, wherein to determine the solution to mitigate vulnerabilities associated with the first subset of devices in the network architecture comprises the computer program instructions, in execution with one or more processors being further configured to:
retrieve a set of threat solution data objects, wherein each of the set of threat solution data objects is associate number of changes to the network architecture;
select a first threat solution data object from the set of threat solution data objects based on a determination that the first threat solution data is associated with a minimum number of changes to the network architecture of the set of threat solution data objects; and
determine at least a portion of the solution to mitigate vulnerabilities associated with the first subset of device in the network architecture based on the first threat solution data object.

14. The non-transitory computer-readable storage medium of claim 13, wherein the computer program instructions, in execution with one or more processors are further configured to:
determine the solution to mitigate the vulnerabilities comprising changes to be made to the network architecture to resolve the vulnerabilities,
wherein the changes comprises removing a device from the one or more networked devices.

15. The non-transitory computer-readable storage medium of claim 13, wherein the computer program instructions, in execution with one or more processors are further configured to:
render the network architecture on a display,
wherein the rendering comprises visually distinguishing the changes made to the network architecture to resolve the vulnerabilities.

16. The non-transitory computer-readable storage medium of claim 13, wherein the computer program instructions, in execution with one or more processors are further configured to:
determine the solution to mitigate the vulnerabilities based on a weighted combination of factors,
wherein the factors comprises protection against vulnerabilities and a projected cost associated with changes to be implemented.

17. The non-transitory computer-readable storage medium of claim 13, wherein the one or more threat solution data objects are retrieved based on (i) requirements of one or more of shared networked devices, (ii) device configurations, and/or (iii) device connections.

* * * * *